(12) United States Patent
Roy et al.

(10) Patent No.: US 7,454,409 B2
(45) Date of Patent: Nov. 18, 2008

(54) DISPLAYING PAID SEARCH LISTINGS IN PROPORTION TO ADVERTISER SPENDING

(75) Inventors: Scott Roy, San Jose, CA (US); Narinder Pal Singh, Half Moon Bay, CA (US)

(73) Assignee: Overture Services, Inc., Pasadena, CA (US)

( * ) Notice: Subject to any disclaimer, the term of this patent is extended or adjusted under 35 U.S.C. 154(b) by 1180 days.

(21) Appl. No.: 10/403,823

(22) Filed: Mar. 31, 2003

(65) Prior Publication Data
US 2003/0220918 A1 Nov. 27, 2003

Related U.S. Application Data

(60) Provisional application No. 60/369,460, filed on Apr. 1, 2002.

(51) Int. Cl.
G06F 17/30 (2006.01)
(52) U.S. Cl. .................................. 707/3; 707/104.1
(58) Field of Classification Search ............ 707/1, 707/2, 3, 10, 104.1; 705/14, 27; 725/109
See application file for complete search history.

(56) References Cited

U.S. PATENT DOCUMENTS

| | | | |
|---|---|---|---|
| 5,659,732 A | 8/1997 | Kirsch | |
| 5,717,923 A | 2/1998 | Dedrick | |
| 5,724,424 A | 3/1998 | Gifford | |
| 5,724,521 A | 3/1998 | Dedrick | |
| 5,724,524 A | 3/1998 | Hunt et al. | |
| 5,748,954 A | 5/1998 | Mauldin | |
| 5,752,238 A | 5/1998 | Dedrick | |
| 5,768,521 A | 6/1998 | Dedrick | |
| 5,778,367 A | 7/1998 | Wesinger, Jr. et al. | |
| 5,794,210 A | 8/1998 | Goldhaber et al. | |
| 5,826,241 A | 10/1998 | Stein et al. | |
| 5,848,397 A | 12/1998 | Marsh et al. | |

(Continued)

FOREIGN PATENT DOCUMENTS

JP 2001142826 A2 5/2001

(Continued)

OTHER PUBLICATIONS

Database of Corporate ResourceNet, "New Service Puts An Auction Search Engine Under One Roof", Electronic Advertising & Marketplace Report, vol. 12, Issue 8, Apr. 1998, p. 6.

(Continued)

*Primary Examiner*—Etienne P LeRoux
(74) *Attorney, Agent, or Firm*—Brinks Hofer Gilson & Lione

(57) ABSTRACT

In a pay for placement database search system, in which advertisers pay to include their search listings in a database to be provided with search results in response to queries from searchers, each advertiser decides how much money he wants to spend on a search term. The search provider displays the advertisers' listings in proportion to the amount of money the respective advertisers spend. This permits the advertisers to subscribe to the database search system, deciding how much to pay for a subscription for a predetermined time period. The search provider can recommend an optimal spend amount for the advertisers.

5 Claims, 22 Drawing Sheets

U.S. PATENT DOCUMENTS

| | | | |
|---|---|---|---|
| 5,848,407 | A | 12/1998 | Ishikawa et al. |
| 5,852,820 | A | 12/1998 | Burrows |
| 5,855,008 | A | 12/1998 | Goldhaber et al. |
| 5,862,223 | A | 1/1999 | Walker et al. |
| 5,864,845 | A | 1/1999 | Voorhees et al. |
| 5,864,846 | A | 1/1999 | Voorhees et al. |
| 5,903,882 | A | 5/1999 | Asay et al. |
| 5,918,014 | A | 6/1999 | Robinson |
| 5,920,854 | A | 7/1999 | Kirsch et al. |
| 5,920,859 | A | 7/1999 | Li |
| 5,930,777 | A | 7/1999 | Barber |
| 5,945,975 | A | 8/1999 | Lundrigan et al. |
| 6,078,866 | A | 6/2000 | Buck et al. |
| 6,134,532 | A | 10/2000 | Lazarus et al. |
| 6,185,558 | B1 | 2/2001 | Bowman et al. |
| 6,269,361 | B1 | 7/2001 | Davis et al. |
| 6,278,966 | B1 | 8/2001 | Howard et al. |
| 6,285,987 | B1 | 9/2001 | Roth et al. |
| 6,286,005 | B1 | 9/2001 | Cannon |
| 6,311,185 | B1 | 10/2001 | Markowitz et al. |
| 6,366,918 | B1 | 4/2002 | Guttman et al. |
| 6,470,269 | B1 | 10/2002 | Adar et al. |
| 6,487,538 | B1 | 11/2002 | Gupta et al. |
| 2002/0004735 | A1 | 1/2002 | Gross |
| 2002/0046104 | A1* | 4/2002 | Kaddeche et al. .............. 705/14 |
| 2002/0099605 | A1* | 7/2002 | Weitzman et al. .............. 705/14 |
| 2002/0120505 | A1* | 8/2002 | Henkin et al. .................. 705/14 |
| 2002/0162117 | A1* | 10/2002 | Pearson et al. .............. 725/109 |
| 2003/0014331 | A1* | 1/2003 | Simons ........................ 705/27 |
| 2003/0110171 | A1* | 6/2003 | Ozer et al. .................... 707/10 |

FOREIGN PATENT DOCUMENTS

| | | |
|---|---|---|
| WO | WO 99/48028 | 9/1999 |
| WO | WO 00/16218 | 3/2000 |
| WO | WO 00/41090 | 7/2000 |
| WO | WO 00/73960 A1 | 12/2000 |
| WO | WO 01/90956 A1 | 11/2001 |

OTHER PUBLICATIONS

Espe, "Online Search Engines Start To Charge For Listings", Washington Business Journal, vol. 18, Issue 1, May 1999, p. 31.
Dawson et al., "2 Search Sites Narrow Their Parameters", Adweek-Western Edition, vol. 48, Issue 42, Oct. 1998, p. 5.
Database of Corporate ResourceNet, "Bits", from Adweek-Eastern Edition, vol. 40, Issue 14, Apr. 1999, p. 46.
Komando, "Searching For Search Engines—from Dogpile to Deja News", Business First-Columbus, vol. 14, Issue 43, Jun. 1998, p. 46.
Database of Corporate ResourceNet, "New services Aim to Boost Efficiency of Search Engines", Electronic Advertising & Marketplace Report, vol. 12, Issue 13, Jul. 1998, p. 6.
Database of Corporate ResourceNet, "Goto.com Chooses Quest's SharePlex(R) for Oracle Software to Ensure Uptime for Business-Critical Web Site", PR Newswire, Jun. 2000, 3 pgs.
Database of Corporate ResourceNet, "Capitalist Tool", Time Canada, vol. 151, Issue 8. Mar. 1998, p. 41.
Database of DialogClassic(m), :Homestead Technologies' Continued Success Draws $17.5 Million In second Round of Venture Funding, PR Newswire, Apr. 1999, 2 pgs.
"APS Search Tools—Patent Search Client Strategy", by US Patent & Trademark Office, Sep. 1997, 5 pgs.
"Frequently Asked Questions NT Image Search & Retrieval (IS &R)", by US Patent & Trademark Office, Dec. 1997 20 pgs.
"Chapter 1-Introduction to Dialog", by Dialog Information Service, Inc. pp. 1-14.
"Automated Patent System (APS) Workstation Reference Manual", by US Patent & Trademark Office, Jul. 1996, 4 pgs.
Frentzen, Jeff, "Help for Getting the Word Out About Web Sites", PC Week, v14, n46, p. 27(1), Nov. 3, 1997, 3 pgs.
Miller, Karen L., "Improve Your Ranking (Building Web Sites to Attract Web Searches)", Home Office Computer, v16, n1, p. 51(2) Jan. 1998, 3pgs.
Wingfiled, "Another Engine Takes Ads By The Click", from http://www.news.com?news/Item/0.4.1387,00/html, May 1996, 3pgs.
Pelline, "New Search Engine Goes Commercial", by CNET News. com, Feb. 1998, 2 pgs.
Wang, "Engines Battle Irrelevance of Results-New Search Service Hope To Fill The Void", Internet World, Feb. 1998, 3 pgs.
Vonder Haar, "Searching For The Highest Bidder", from Inter@ctive week, Feb. 19, 1998.
Riedman, "Search Engine Startup To Auction Listings", from Advertising, Feb. 23, 1998, 1 pg.
Rich, "New Search Engine Allows Sites To Pay Their Way to Top", from http://www.adweek.com/iq/iqnews02.asp, dated Feb. 23, 1998, 1 pg.
Mardesich, "Web Site Operators Pay for Top Billing-Search Engine Allows Site Sponsors to Buy Place On Special List", from Knight Ridder Newspapers, Mar. 1998, 2 pgs.
Hilty, "GoTo.Hell-What Happens When On Line Search Engine Accepts Cash From Web Sites?" from http://www.ocweekly.com/link/archives/97/27/byte-3.11.98-1.html, Mar. 1998, 3pgs.
Flynn, "With GoTo.com's Search Engine, the Highest Bidder Shall Be Ranked First", by the New York Times, Mar. 1998, 1 pg.
Clark, "Start-Up Plans Internet Search Service Tying Results To Advertising Spending", from the Wall Street Journal, Feb. 1998, 1pg.
"Going, Going . . . ", from A Closer Look of the Wall Street Journal-Marketplace, Apr. 1998, 1 pg.
"Coursey.com", David Coursey's Insider report on Personal Computing, the Internet and Communications, Mar. 1998, 2 pgs.
Glaser, "Who Will GoTo.com", from OnlinePress.com, Feb. 1998, 2 pgs.
Mardesic, "Search Engine Charges Hit Sites", from http://www.sjmercury.com/business/center/goti022198.html, Feb. 1998, 2 pgs.
"News Watch About Search Engines", from http://searchenginewatch.com/ness.html, Feb. 1998.
Swartz, "Browser Only Lists Paying Web Sites Critics Fear Approach Will Squeeze Out Most Small Internet Players", from http://www.sfgate.com/cgi-bin/ publish on San Francisco Chronicle, Feb. 1998, 3 pgs.
McWilliams, PC World Online, "Search Engine To Sell Top Positions On Results Lists", from http://www.pcworld.com/news/daily/data/0298/....html., Feb. 23, 1998, 1 pg.
Alyson, "Searching The Search Engines", from Front Page, May 1998, 1 pg.
Pelline, "Pay-for-placement gets another shot", from http://www.newscom./news/item/0,4,19307,00.html, Sep. 1997, 3 pgs.
IBM Technical Disclosure Bulletin, "Organizing A Ranked List of Search Matches", Nov. 1994, 2 pgs.
Jeffrey Brewer, ClickZ Today, Aug. 18, 1998, "Pay-For-Performance: Creating More And Better Value", obtained at the internet address http://www.clickz.com, Aug. 18, 1998, 5 pgs.
Jesse Berst, ZDNet, Aug. 17, 1998, "Search Sites' Shocking Secret", obtained at the internet address http://www.zdnet.com/anchordesk/story/story_2432.html, Aug. 17, 1998, 2 pgs.
Sara Fisher, "Budding Internet Firm Finds Niche in Satisfication", L.A. Business Journal, Aug. 10, 1998, 1 pg.
"Disclosure Rules", The Industry Standard—The Newsmagazine of the Internet Economy, Aug. 10, 1998, pg.
G. David Doran, "Pay to Play", Entrepreneur, Jul. 1998, p. 18.
Advertising Age-Interactive Daily Homepage; obtained at the internet address http://www.adage.com/interactive/daily/index.html, Jun. 8, 1998.
Kim Komando, "With About 320 Million Sites, Search Engines Offer Some Help", 1998, Los Angeles Times Syndication, 1 pg.
Margot Williams, "How To Ease Your Online Searches", Lansing State Journal, Jun. 1, 1998, 1 pg.
"GoTo.com Gets Venture Funding", Internet World Magazine, Jun. 1, 1998. 1 pg.
Search Engine Watch, Feb. 21, 1998, "GoTo Sells Positions", obtained at the internet address http://www.searchenginewatch.com/news.html, Feb. 23, 1998.

Jeff Pelline, "New Search Engine Goes Commercial", from http://www.news.com/News/Item/ 0,4,19281,00.html, Feb. 20, 1998, 2 pgs.

Don Clark, "Start-Up Plans Internet Search Service Tying Results To Advertising Spending", The Wall Street Journal, Feb. 20, 1998, 1 pg.

Interactive Week Magazine, Garden City, N.Y. May 25, 1998 1 pg.

Jeff Pelline, "New Search Engine Goes Commercial", CNET News.com, from http://www.news.com/News/Item/0,4,19281,00.html, Feb. 20, 1998.

Nick Wingfield, Staff Writer, CNET News.com, Jun. 21, 1996, "Engine Sells Results, Draws Fire", obtained at the internet address http://www.news.com/News/Item/Textonly/0,25,1635,00.html, Jul. 29, 1999, 2 pgs.

Rose Aguilar, Staff Writer, CNET News.com, Apr. 29, 1996, "New Ad Model Charges By The Click", obtained at the internet address http://www.news.com/News/Item/0,4,1199,00.html, Jul. 29, 1999, 3 pgs.

Alex Lash, Staff Writer, CNET News.com, Dec. 11, 1996, "Open Text Updates Tools", obtained at the internet address http://www.news.com/News/Item/0,4,6118,00.html, Jul. 29, 1999, 3 pgs.

"About SearchUP, Inc.", Jul. 15, 1999, obtained at the internet address http://www.searchup.com/about.cfm, 2 pgs.

"Testimonials"., Jul. 15, 1999, obtained at the internet address http://www.searchup.com/testimonials.cfm, 2 pgs.

"Benefits", Jul. 15, 1999, obtained at the internet address http://www.searchup.com/benefits.cfm, 3 pgs.

"Information", Jul. 15, 1999, obtained at the internet address http://www.searchup.com/information.cfm, 4 pgs.

"Tips & Tricks", Jul. 15, 1999, obtained at the internet address http://www.searchup.com/tipsandtricks.cfm, 3 pgs.

Saul Hansell "Alta Vista Invites Advertisers to Pay for Top Ranking", The New York Times, Apr. 15, 1999, p. C2.

Galore—Super Search Engine, May 21, 1999, obtained at the internet address http://www.galore.com/1/mainframe.shtml, 7 pgs.

hitsgalore.com Search Engine, May 21, 1999, obtained at the internet address http://www.hitsgalore.com, 8 pgs.

I Seek It "The Next Generation Search Engine", May 21, 1999, obtained at the internet address http://www.iseekit.com, 6 pgs.

SearchUP.com—Internet Directory, Automated Bid Placement System, obtained at the internet address http://www.searchup.com/search.cfm, Aug. 25, 1999, 3 pgs.

SearchUP: URL Position Manager, obtained at the internet address https://www.securearea.net/searchup/login.cfm, Aug. 25, 1999, 1 pg.

SearchUP: URL Position Manager, obtained at the internet address https://www.searcharea.net/searchup/newaccount.cfm, Aug. 25, 1999 2 pgs.

SearchUP: URL Position Manager, obtained at the internet address https://www.securearea.net/getaccount/login.cfm, Aug. 25, 1999 7 pgs.

Jeff Fretzen, "Help For Getting The Word Out About Web Sites", PC Week, Vo. 14, No. 46, Nov. 3, 1997, p. 27(1).

Article from the Search Engine Report, "GoTo To Sell Positions", Mar. 3, 1998, http://www.searchenginewatch.com/sereport/9803-to-to-html, 5 pgs.

Press release on Lightweight Directory Access protocol (LDAP), Netscape Comm. Corp. Mountain View, CA, Apr. 1996, 3 pages.

ClickMail Central directory, circa Apr. 1996, http://www.oneclick.com/server/specs.html, 4 pages.

GoTo.com, circa 1998, at www.goto.com/d/search=results, 5 pages.

Northern Light, circa 1997-98, at sirocco.northernlight.com, 11 pgs.

Smith, Laura B., article "Going . . . Gone", PC Week, vol. 13, No. 34, Aug. 26, 1996, p. E1 (2), http://www.dialog-classic.com/DialogClassic/dialog.

Cliff Kurtzman, "Another Internet Advertising List", Internet Advertising Digest #006, dated Jun. 19, 1996, from http://www.o-a.com/archive/1996/june.0021.html, printed Sep. 28, 2001, 5 pages.

Press Release article titled "GoTo.com Announces First round of Financing, Totaling More Than $6 Million, Led by Draper, Fisher Jurvetson", Business Wire, dated May 19, 1998, printed from the Internet at <http://www.dialogclassic.com/main.vingw> on Nov. 9, 2000, 2 pages.

News of The Week articles, Telephony, May 1, 1995, pp. 8 and 10.

Nuts 'N Bolts articles, Target Marketing, Oct. 1997, 1 page.

DoubleClick Testltl, obtained at the internet address: http://web.archive.org/web/19980205034316/www.doubleclick.com/nf/adinfo/testiset.htm, dated Oct. 16, 2002, 4 pages.

DoubleClick Frequently Asked Questions, obtained at the internet address: http://web.archive.org/web/19980205033925/www.doubleclick.com/nf/adinfo/facts.htm, dated Oct. 16, 2002, 5 pages.

"New Service Puts Ad Auction, Search Engine Under One Roof", article from Electronic Advertising & Marketplace Report, Simba Information, Inc. Apr. 28, 1998, 2 pages.

Google Search, communication from Jeffrey Brewer at Jeffrey@goto.com, titled "Need reverse stemming software", dated May 27, 1998, obtained at the internet address: http://groups.google.com/groups?selm=356CEE4A8DE882A8%40goto.com, on Dec. 19, 2002.

Ketchpel, Steven P. et al. "U-PAI: A Universal Payment Application Interface", conference material article from the Second USENIX Workshop on Electronic Commerce Proceedings, Oakland, California, Nov. 18-21, 1996, 17 pages.

Schwartz, Randal L., "Click-Through Tracking in Perl", Web Techniques, dated May 1998, located at the internet address: www.webtechniques.com, 3 pages.

Van Roeden, Adriaan, "Your Own Search Engine With SWISH, A Custom Search Facility For Your Web Site", Web Techniques, dated Nov. 1996, located at the internet address: www.webtechniques.com, pp. 63-66 pages.

Full Catalog—Categories Menu, Sun Microsystems Sun Solutions Catalog, obtained at the internet address: http://web.archive.org/web/19981205110211/solutions.sun.com/cataiogs/all/index.htm, printed on Dec. 19, 2002, 2 pages.

Help on Making Queries—Search by Company or Product, obtained at the internet address: http://web.archive.org/web/19981203050002/solutions.sun.com/search-help.htm, printed on Dec. 19, 2002, 4 pages.

Online Updating, Sun Microsystems Sun Solutions Catalog obtained at the internet address: http://web.archive.org/web/19990220190636/solutions.sun.com/editmodule/help.html, printed on Dec. 19, 2002, 2 pages.

International Search Report for corresponding application No. PCT/US03/09528, dated Jun. 19, 2003, 1 page.

International Search Report for corresponding Patent Cooperation Treaty Application No. PCT/US03/09528, dated Jun. 19, 2003, 3 pages.

Written Opinion for corresponding Patent Cooperation Treaty Application No. PCT/US03/09528, dated Jan. 22, 2004, 4 pages.

International Preliminary Examination Report for corresponding Patent Cooperation Treaty Application No. PCT/US03/09528, dated May 17, 2004, 8 pages.

PayPerClick SearchEngines.com, Cost-effective, highly targeted website traffic, May 2001.

* cited by examiner

DISPLAYING PAID SEARCH LISTINGS IN PROPORTION TO ADVERTISER SPENDING

REFERENCE TO RELATED APPLICATIONS

This patent application claims the benefit of the filing date under 35 U.S.C. §119(e) of Provisional U.S. Patent Application Ser. No. 60/369,460, filed Apr. 1, 2002, which is hereby incorporated herein in its entirety by this reference.

BACKGROUND

A pay-for-placement search engine works like an online version of the Yellow Pages: a user performs a search, and the system displays paid advertiser listings that match the user's query. Because screen real estate is limited, a user will typically only see a small fraction of the listings that match his query. So in order to create a workable system, the search engine provider needs to decide how often to display each listing, how much to charge, and the order in which listings should appear.

The current state of the art is Overture's search engine, available at www.overture.com. Overture uses a scheme known as bid-for-rank, in which it charges advertisers by the click and orders listings based on how much each advertiser is willing to pay for each click. An advertiser can bid whatever he likes, with a minimum bid of five cents per click. Many web sites display Overture search results, and since each shows a different number of search results starting at the top of the list, there is strong incentive to be near the top. The advertiser with the highest bid always appears, and advertisers appear less and less frequently as their bids decrease. In theory, the advertisers that provide the highest quality of service bid the most and appear at the top of the list. In practice, the system rarely works this well. The scheme is conceptually simple, but it has a number of problems that make it frustrating for both users and advertisers.

From a user's perspective, the problem is that bid-for-rank can lead to irrelevant, unwanted search listings close to the top. Advertisers have complete control over the order in which their listings appear, and smart advertisers can take advantage of this freedom to get free exposure at the user's expense. As an example, imagine there is an advertiser selling pet ferrets. The advertiser appears under very specific search terms, like "ferret" and "pet ferret", and also under more generic terms, like "pets". When a user searches for "pet ferret", it makes sense that the ferret advertiser appears at the top of the list, because the user is almost certainly looking for what he is selling. For a more generic term like "pets", though, the ferret advertiser should not appear near the top. A user that types in "pets" is much more likely to be looking for a dog or a cat than a ferret.

Unfortunately, if the ferret advertiser is smart he will create a listing that reads something like, "Great pet FERRETS! Super CHEAP!" He can afford to bid a very high price for this listing—a price that takes him to the top of the list—because he knows that when a user clicks on it, the user clearly sees it is about ferrets. There is enough information in the listing that the advertiser is very likely to get a sale. In the bid-for-rank system, the advertiser does not pay for being at the top of the list; he only pays if a user actually clicks on his listing. This listing is so specific that a user will only click on it if he is interested in ferrets, so there is very little risk to the advertiser, even if the listing appears under a generic term like "pets". The consequence is that the first search result for "pets" is a listing that is only relevant to a few users. For everyone else the listing is useless, and the overall search experience is poor.

The ferret phenomenon is common with pay-for-placement search engines. The Yellow Pages does not suffer from this problem, because advertisers are forced to pay based on how much space they take up on the page.

From an advertiser's perspective, the problem with bid-for-rank is that it is complicated, and hard for him to know what he gets. When an advertiser bids to a particular rank, he has no way to calculate in advance how many clicks he is likely to receive, or how much money he is likely to spend, or whether he would have a higher profit at some other rank. He cannot even be sure that he will get the rank that he wants, because another advertiser might step in after him with a higher bid. If the advertiser is on a fixed budget, he must continually monitor his spending to make sure he does not go over budget, while still keeping his bids high enough to get the maximum possible number of clicks. Typically, he must deal with all of these uncertainties for fifty or a hundred different search terms, each of which has its own bids.

As an example, suppose an advertiser is currently bidding $1.00 to be in the number 2 position for the search term "fresh fish". He can stay where he is, increase his bid to $1.20 to move up to rank 1, or decrease his bid to $0.80 to move down to rank 3. In order to make this decision, he needs to know how many clicks his is likely to receive at each of the three ranks. It is next to impossible for him to get this information. Given the current state of the art, in fact, search engine providers cannot even say for certain that he will get more clicks at rank 1 than at rank 3. Even if the advertiser decides it does make sense to bid up to rank 1, there is no guarantee that a few hours later one of the other advertisers will not outbid him. Or, equally possible, the advertiser can bid up to rank 1, and then discover a few days later that he is overpaying because the advertisers below him have dropped out. The advertiser must continually monitor his bid and position to make sure he gets what he wants, without overpaying. The current state of the art is to keep track of bids using electronic bidding agents. Examples are at www.gotoast.com, www.did-it.com and www.pay-per-click-bid-managers.com. However, these are limited in how well they can perform because they only run periodically, and they often cannot get the information they need from the search engine providers, information like how many clicks an advertiser is likely to receive at different ranks.

If the advertiser is on a fixed budget, then he must also continually monitor his spending to make sure he is on target to meet his budget. Suppose, for example, that the advertiser has $1,000 to spend over the next month. If he sets his bid to $1.00, and 50 users click on his listing the first day, then he must lower his bid because his spending rate is too high. At $50/day, he will burn through his entire budget before the end of the month. Conversely, if only 10 users click on his listing the first day, then he must raise his bid because his spending rate is too low. The interaction between bids and budgets is complicated, and difficult to get right without constant adjustment. It can also lead to poor search results, since instead of seeing the best, most relevant advertisers, a user often simply sees the advertisers that are currently under their budgets.

All of these problems become even more complicated when an advertiser bids on multiple search terms. Each term receives a different number of searches and clicks, and requires different bids. The advertiser must somehow allocate his money among them in a way that optimizes his total profit. There are currently no good tools to help the advertiser do this, and even the best bidding agents make no attempt to raise and lower bids across multiple terms to match a fixed budget.

Many advertisers would prefer an alternative to this system. The elaborate bid structure requires too much micromanagement, and it obfuscates the only two issues that an advertiser really cares about: how much he has to pay, and what he gets in return. An advertiser would like the search engine provider to tell him that for $1,000 he can buy 1,000 clicks over the next month; or he can spend twice as much, and get twice as many clicks, or spend half as much, and get half as many clicks. This model is much more in line with other methods of advertising, like the Yellow Pages and Internet banner ads. When the information is distilled down to cost and clicks, it is clear that the entire concept of bids and ranks is unnecessary. An advertiser does not really care about what rank he appears at in a search result list. He cares about how many clicks he gets for his money, and how often those clicks turn into sales. Ideally, he can make his buying decisions on this information alone—how much he pays, and how many clicks he gets in return—and leave all the other details about where and when his listing shows up to the search engine provider. A system based on this idea gives the search engine provider complete freedom to decide which listings it should show in response to a user's query, so it solves the ferret problem in addition to being much simpler for advertisers.

BRIEF SUMMARY

The present embodiments eliminate bids and ranks while keeping the best features of the bid-for-rank scheme: setting prices automatically using an auction, and allowing advertisers to pick the search terms where they should appear. In addition, these embodiments automatically optimize each advertiser's spending across the search terms where he appears, so there is no need for bidding agents.

The idea behind these embodiments is simple. Each advertiser decides how much money he wants to spend on a search term, and the search provider displays the advertisers' listings in proportion to the amount of money the respective advertisers spend. Suppose there are N advertisers competing for space on a search results page that displays M listings. If there are T searches, then the search provider has TM total impressions to distribute among the advertisers. An impression is the display of a search listing among search results presented to a searcher. If the amount of money that advertiser i is willing to spend is $a_i$, then the number of impressions he receives is, $$IMPRESSIONS_i = TM \frac{a_i}{a_1 + \cdots + a_N} \quad (\equiv t_i) \quad (1)$$

The number of clicks he can expect is, $$CLICKS_i = t_i r_i (\equiv c_i) \quad (2)$$

The term $r_i$ is the advertiser's click-through rate, the probability that a user clicks on his listing when he appears in a search.

In order to distribute the right number of impressions to everyone, the provider keeps a running total $s_i$ of how many impressions each advertiser receives. When a user performs a search, the provider calculates the discrepancy between this number and how many impressions the advertiser should have received. This discrepancy is, $$DISCREPANCY_i = s_i - t_i \frac{S}{T}$$

S is the total number of searches that have taken place. The provider sorts the advertisers by discrepancy and returns the top M. The order of the returned listings can be random, sorted by the click-through rates $r_i$, sorted by the perceived quality of the listings, or sorted by some other criterion. This algorithm ensures that every advertiser receives the correct number of impressions after T total searches, while distributing the impressions evenly over time.

There is a limit to how many impressions an advertiser can buy. Since in one embodiment, no advertiser can appear more than once in any search result, he cannot have more than T total impressions. Letting A be the total amount of money that all of the advertisers spend, the amount of money that puts an advertiser over this limit is, $$a_i > \frac{A}{M} \quad (3)$$

We refer to this limit as the traffic limit. If an advertiser is over the traffic limit, the search engine provider leaves the extra impressions blank. If N≦M then there is always at least one advertiser that is at the traffic limit, and the market breaks down. In this case the search engine provider can decrease the number of listings it returns so that M<N and the advertisers have an incentive to compete. Alternatively, the provider can always set the number of listings to some fraction of the number of advertisers, for example M=0.5N.

In the preferred embodiment an advertiser pays for clicks or clickthroughs, not impressions, and the price is fixed at the point of sale. A click or clickthrough is the action of a searcher viewing an advertiser's search listing and clicking on its associated hyperlink or otherwise selecting to view the search listing. The searcher's web browser is then redirected to the uniform resource locator (URL) associated with the search listing. When an advertiser wants to buy clicks, the search engine provider comes up with a cost-per-click that depends on how often he expects users to click on the advertiser's listing, and how much total advertising he expects to sell. The cost-per-click that the provider quotes is, $$CPC_i = \frac{\hat{A}}{TM\hat{r}_i}$$

In this equation $\hat{A}$ is the search engine provider's estimate for the total amount A of advertising he expects to sell for the T searches, and $\hat{r}_i$ is his estimate of the advertiser's click-through rate. An advertiser's cost-per-click goes up as his expected click-through rate goes down. If everyone has the same click-through rate, then everyone pays the same CPC. The search engine provider quotes the number of clicks he expects to deliver as, $$ESTIMATED\_CLICKS_i = TM\hat{r}_i \frac{a_i}{\hat{A}}$$

To complete the sale, the advertiser decides on the amount $a_i$ he wants to spend at the indicated cost-per-click. The provider delivers clicks at this price until the advertiser reaches his spending limit or the users finish T total searches.

The search engine provider controls the price by adjusting his estimate $\hat{A}$. He makes the most money when his estimate is as accurate as possible, when $\hat{A}=A$. If the estimate $\hat{A}$ is too small, then the click estimates are too large, and the advertisers spend $\hat{A}$ without reaching their individual limits. In this case the provider should raise the price by increasing $\hat{A}$. The advertisers will tend to spend less, but the total amount $\hat{A}$ that the provider makes will go up. If the estimate $\hat{A}$ is too big, then the click estimates are too small, and the advertisers reach the total limit of A before the end of T searches. In this case the provider should decrease the price by lowering $\hat{A}$. The advertisers will tend to spend more, and the total amount A that the provider makes will again go up. If the estimate $\hat{A}$ is just right, then each advertiser pays his individual spending limit $a_i$ without any unsold clicks. Similarly, the search engine provider does best when all of the estimated click-through rates are as accurate as possible.

One way to make good estimates of the total spending and the click-through rates is to use historical data. Suppose, for example, that the historical click-through rate for an entire market is CTR. Then the provider can estimate an individual listing's click-through rate using the formula, $$r_i = \frac{u_i + kCTR}{s_i + k}$$

The term $u_i$ is the number of clicks a listing has received, and $s_i$ is the number of impressions. For a new listing these numbers are zero, and the estimate defaults to the overall click-through rate CTR. For a listing that has received many clicks and impression, the estimate approaches the observed frequency. The constant k acts as a scaling factor that determines how quickly the estimate changes between these two values. When an advertiser decides to buy more clicks for his listing, the provider quotes a cost-per-click based on the most up to date estimate of $r_i$. The provider can also estimate click-through rates in other ways, for example by comparing a new listing to other listings for which there is historical data.

There are many other ways for the provider to run the process of signing up advertisers. For example, he can run a weekly or monthly auction to fix the amounts $a_i$, or he can allow advertisers to continually adjust them. This disclosure is not limited to any particular scheme.

Every web site that displays search results is different. In the current state of the art the number of listings varies between 1 and 20, and some web sites display complete listings whereas others only display titles. Because of these differences, the preferred embodiment treats every combination of search term and web site as a separate market. An alternative is to treat all of the impressions that a search term receives anywhere as a single market. In this case the traffic limit formula is different than Equation 3, but the other equations and algorithms remain the same. An ordinarily skilled practitioner will have no problem deriving new traffic limit formulas that are appropriate for this alternative formulation.

An advertiser typically spends money on many different search terms. One advantage of the current invention is that the provider can recommend the optimal amount that an advertiser should spend and automatically allocate his money among the different markets. If an advertiser follows the provider's recommendations, then he is guaranteed to maximize his expected profit. The remainder of this section describes the necessary formulas and algorithms, starting with the case of a single advertiser in a single market, and working up to the full problem of many advertisers in many markets.

In order to optimize an advertiser's spending, the provider needs to know three things: the advertiser's total budget $b_i$, his profit-per-click $p_i$, and the external rate of return R that is available to all advertisers if they spend their money elsewhere. The advertiser's expected profit from buying paid listings in a single market is then, $$\text{PROFIT}_i = (p_i c_i - a_i) + R(b_i - a_i) \quad (\equiv f_i) \quad (4)$$

The first term is the advertiser's profit from his paid listings; the second is his profit from investing money elsewhere. If the external rate of return R is high, then the advertiser should spend less of his budget on clicks. The value of $a_i$ that maximize his profit is, $$a_i = -d_i + \sqrt{\frac{T}{1+R} v_i d_i} \quad (5)$$

The quantity $d_i$ is the total amount of money being spent by other advertisers in the market; $v_i = r_i p_i$ is the advertiser's market value. The amount that an advertiser should spend goes down as either his click-through rate or his profit-per-click decreases. If $a_i$ is less than zero, or less than the provider's minimum spending amount, or greater than the traffic limit, or greater than the advertiser's budget, then it is constrained to the appropriate value.

When there are multiple markets the optimal solution is to treat them independently. The advertiser's optimal spending is given by one instance of Equation 5 for each market. The quantities T, $v_i$, and $d_i$ can all be different in each market. The only interaction between the markets is the advertiser's budget limit, $$\sum_j a_{ij} \leq b_i$$

The sum is taken over all markets. In order to enforce this limit, the advertiser's market value incorporates a budget scaling factor, $v_{ij} = \lambda_i r_{ij} p_{ij}$. Notice there is a single $\lambda_i$ that scales the advertiser's value uniformly in every market. If the advertiser is not budget limited, then $\lambda_i = 1$. If he is budget limited, then $\lambda_i$ is set to the value that exactly spends his budget. Any good numeric equation solver can find this value. Examples include the online guide to nonlinear equation solvers, at www.ece.nwu.edu/OTC and *Numerical Methods for Unconstrained Optimization and Nonlinear Equations*, Dennis and Schnabel, ISBN 0898713641.

When there are multiple advertisers in a single market the problem is more complicated. If any advertiser changes the amount he is willing to spend, the optimal solution for the other advertisers changes. One possible algorithm is to iteratively solve for each advertiser and hope that the iterations converge. If they do converge, the final answer will be a fixed point where no advertiser can increase his profit unless another advertiser changes how much he is willing to spend. Using the definition for $f_i$ from Equation 4, this fixed point satisfies the system of equations, $$\frac{\partial f_i}{\partial a_i} = 0 \quad i = 1 \ldots N \quad (6)$$

The fixed point is not a global maximum for any advertiser, since if one advertiser changes the amount he spends, then the profit for other advertisers might go up. Still, since it maximizes each advertiser's profit with respect to the one quantity he can control—his own spending—it is the correct solution to the problem.

It is possible to solve the system of Equations 6 in closed form. The solution for each advertiser is, $$a_i = A\left(1 - \frac{v_L}{v_i}\right) \tag{7}$$

The total dollar amount A that all of the advertisers spend together is, $$A = \frac{T}{1+R} v_L \tag{8}$$

The quantity $v_L$ is the lowest market value that an advertiser can have before Equation 7 becomes negative and the advertiser should not spend any money. Its value is related to the harmonic mean of all the advertiser values, $$v_L = \bar{v}\left(1 - \frac{1}{N}\right) \tag{9}$$

where the harmonic mean value $\bar{v}$ is, $$\bar{v} = \frac{N}{\sum 1/v_i} \tag{10}$$

Another interesting quantity is $v_U$, the largest value an advertiser can have before he becomes traffic limited. Its value is, $$v_U = v_L \bigg/ \left(1 - \frac{1}{M}\right) \tag{11}$$

Equations 7-11 are the fundamental formulas of these embodiments.

When computing the optimal spending amounts using Equation 7, it is possible that some advertisers will have an optimal amount that is less than zero or greater than the traffic limit. These solutions are impossible in the real world. The algorithm to find a valid solution is to pick one of the advertisers that is out of bounds, constrain him to the appropriate limit, remove him from the problem, and recompute the solution for everyone else. This process continues until the algorithm reaches a valid solution. The recomputed values at each iteration use a slightly different formula for $v_L$, $$v_L = \bar{v}\left(1 - \frac{m}{Mn}\right) \tag{12}$$

In this equation, m is the number of free spaces on the search results page that are not taken up by advertisers at the traffic limit, and n is the number of free advertisers that are not at either the zero limit or the traffic limit. The harmonic mean $\bar{v}$ is computed over the free advertisers. If all of the advertisers are free, then m=M and n=N, and the solution is identical to the earlier formula of Equation 9.

The algorithm for picking which advertiser to remove looks at the total signed excess spend that is either negative or over the traffic limit:

$$E = \sum e_i \quad e_i = \begin{cases} a_i & \text{if } a_i < 0 \\ a_i - A/M & \text{if } a_i > A/M \\ 0 & \text{otherwise} \end{cases} \tag{13}$$

If E<0, then there is a preponderance of excess spending with the advertisers that are below the zero limit, and the algorithm removes the advertiser with the lowest market value. If E≧0, then there is a preponderance of excess spending with the advertisers that are over the traffic limit, and the algorithm limits the advertiser with the largest market value to the traffic limit. The boundary case E=0 is decided in favor of adding a traffic limit to make sure that the market never breaks down with fewer advertisers than spaces on the search results page.

When there are multiple markets and multiple advertisers, the optimal solution is to treat them independently. As with a single advertiser, each advertiser's market value incorporates a budget scale factor that limits his spending across all markets. If an advertiser is not budget limited, then his budget scale factor $\lambda_i=1$. If the advertiser is budget limited, then $\lambda_i<1$. Renumbering the advertisers so that the first k are the ones that are budget limited, the algorithm to satisfy the budget constraints is to solve the simultaneous system of non-linear equations, $$\sum_j a_{i,j} = b_i \quad i = 1 \ldots k \tag{14}$$

The free variables are the $\lambda_i$ for the advertisers at their budget limit. The values of $a_{ij}$ are given by Equations 7 and 12, constrained to the limits of 0 and $A_j/M_j$. Any good equation solver can solve this system numerically.

There are a few practical issues. First, since an advertiser's market value changes as his budget scale factor changes, his optimal spend can cross either a zero limit or a traffic limit as we solve the system of Equations 14. It is therefore important to always compute $a_{ij}$ using Equations 7 and 12, even if an advertiser is initially constrained in some market. By always using the equations, an advertiser's total optimal spend varies smoothly between zero and its maximum value.

Second, because the market constraints can change when solving for the $\lambda_i$, the algorithm must iterate until it reaches a stable solution. The algorithm is: first solve for all of the zero constraints and traffic constraints in each market, finding the m and n values, then solve for the budget constraints, holding the m and n values fixed. If any advertiser crosses a zero limit or a traffic limit while solving for the budget constraints, repeat the process.

Third, the algorithm must decide which advertisers to include in Equation 14 when it solves for the budget constraints. The algorithm includes any advertisers that are over budget, and any advertiser for which $\lambda_i<1$. This combination gives a working set of advertisers that are at their budget limit. It is possible that this working set is wrong, and that some of the advertisers are really under budget, even when $\lambda_i=1$. In this case Equation 14 has no solution with the current working set. A good equation solver will solve for as many of the budget constraints as it can. At the next iteration, the algorithm will remove the advertisers that do not belong in the working set and resolve Equation 14.

Finally, there are regions where an advertiser's total optimal spend does not change as his budget scale changes. This situation occurs when an advertiser is constrained in every market. FIG. 21 illustrates the problem. This figure plots how an advertiser's total optimal spend varies as a function of his budget scale. The graph is flat on the left, because the advertiser's optimal spend is below the zero limit in every market, and it is flat on the right, because his optimal spend is over the traffic limit in every market. These flat regions can cause problems for a numeric equation solver.

The solution is to provide the two points min $\lambda_i$ and max $\lambda_i$ as bound constraints on $\lambda_i$ for the equation solver. These bounds replace the usual limits of zero and one. Within a single market, min $\lambda_i$ is the point at which an advertiser reaches the zero limit, and max $\lambda_i$ is the point at which he reaches the traffic limit. These values are, $$\min \lambda_i = \lambda_i \left( \frac{v_L - \beta}{v_i - \beta} \right) \quad (15)$$

$$\max \lambda_i = \lambda_i \left( \frac{v_U - \beta}{v_i - \beta} \right)$$

The value of $\beta$ is, $$\beta = \begin{cases} 0 & \text{if advertiser is constrained} \\ \overline{v}/n & \text{if advertiser is free} \end{cases}$$

The desired bound constraints are the minimum and maximum of these values across all markets. It is possible that even with these limits the equation solver will encounter flat regions in the middle of the spending graph. These flat regions occur in rare cases when an advertiser is below the zero limit in some markets and above the traffic limit in the rest. In this case the algorithm is to restart the equation solver with a $\lambda_i$ value that falls outside of the flat region so that it can make progress.

An advertiser can forgo the automatic optimization and adjust his spending himself. All of the equations continue to hold for the other advertisers, except that the formula for $v_L$ changes. If C is the total amount of money contributed by the advertisers spending a fixed amount, then $$v_L = \frac{1}{2} v_0 + \frac{1}{2} \sqrt{v_0^2 + \frac{4C(1+R)\overline{v}}{Tn}} \quad (16)$$

The quantity $v_0$ is the old zero limit value from Equation 12, $$v_0 = \overline{v} \left( 1 - \frac{m}{Mn} \right)$$

Notice that $v_L$ reduces to $v_0$ when C=0. Another interesting test is n=1 and m=M. In this case $v_0$=0, and Equation 16 leads back to the original one advertiser result of Equation 5.

In one embodiment, a subscription method is implemented for a pay for placement databasse search system. The method includes a search provider offering advertisers a numbere of searcher engagements at a specified cost. Searcher engagements may be impressions, clicks or clickthroughs, post-clickthrough actions or some other type of engagement. In this manner, the advertisers can select the number of clicks or the amount they are willing to pay and subscriber accordingly. The subscription can be for a set period of time, such as one month, or can be arranged in any mutually agreeable way. The search provider may offer different rates for different advertisers, or according the number of search listings or markets in which the advertiser participates.

The methd further includes initiating subscription accounts with subscribing advertisers. The subscription accounts may be credited with payments from the advertisers and subsequently automatically deducted as searcher engagements occur.

The pay for placement database search system will subsequently receive search requests from searchers. In response to these search requests, the database search system will provide search results. Some of the search results may be listings of subscribing advertisers if the search query matches the search listing. If a subscribing advertiser search listing is provided with a page of search listings, the subscription account will be adjusted accordingly. This may be done by tallying in the account the number of impression or clickthroughs paid for by the subscribing advertiser and deducting one for each search listing provided to a searcher. Any other sort of subscription management may be employed.

DETAILED DESCRIPTION OF THE PRESENTLY PREFERRED EMBODIMENTS

Figure 1:
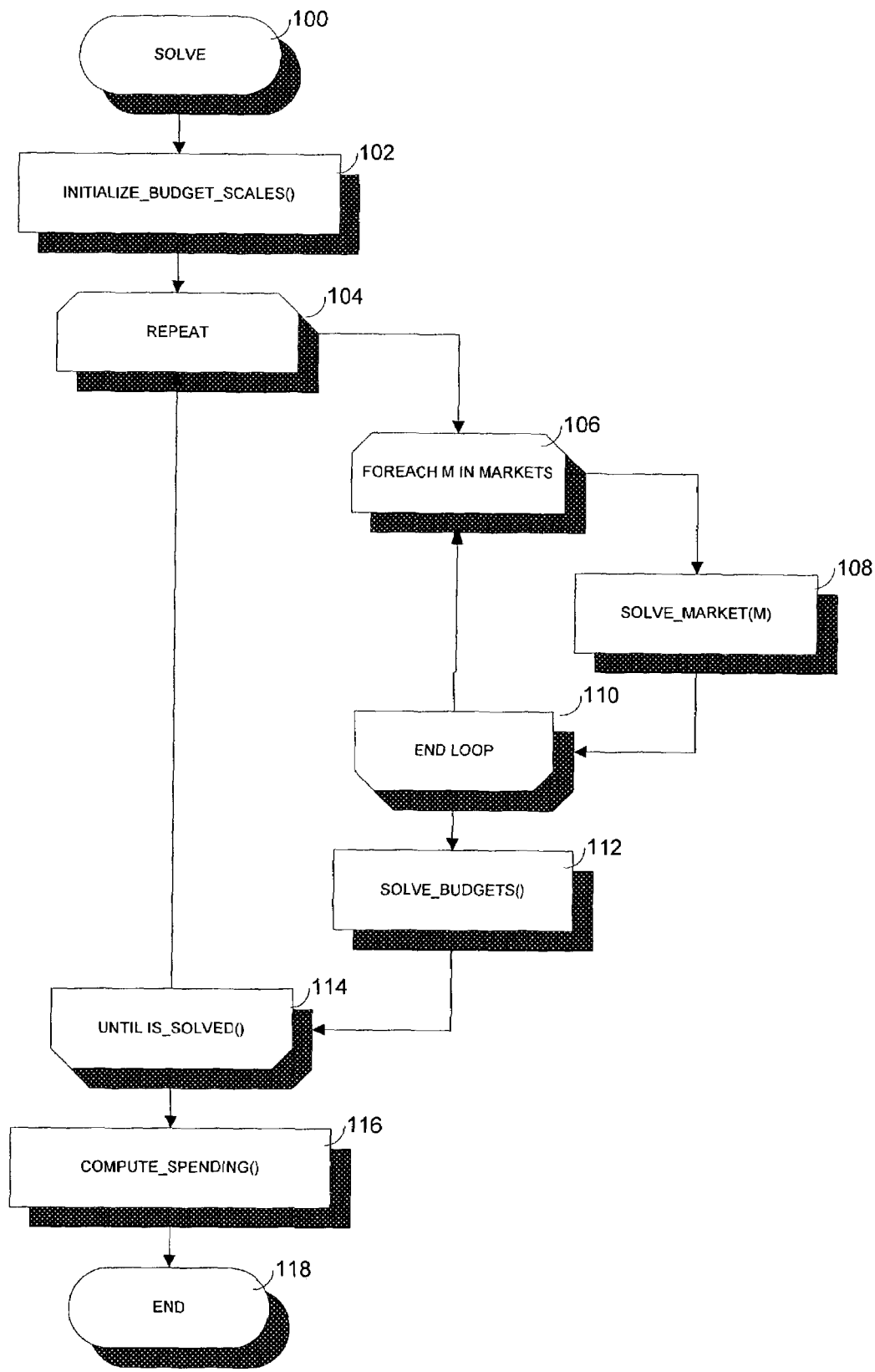
FIGS. 1-20 are flow diagrams showing detailed algorithm for finding each advertiser's optimal spending.

Referring now to the drawing, FIGS. 1-20 form a flow diagram presenting a detailed algorithm for finding each advertiser's optimal spending. The inputs to the algorithm are,

| | |
|---|---|
| SEARCHES[M] | The number of searches in a market M. |
| SPACES[M] | The number of spaces on a search results page. |
| ROI[M] | The external rate of return. |
| PROFIT_PER_CLICK[A, M] | An advertiser's profit-per-click. |
| CLICK_RATE[A, M] | An advertiser's click-through-rate. |
| BUDGET[A] | An advertiser's budget. |

The outputs of the algorithm are,

| | |
|---|---|
| SPEND[A, M] | An advertiser's optimal spending amount. |
| CONSTRAINT[A, M] | An advertiser's constraint state. |
| LAMBDA[A] | An advertiser's budget scale factor. |

Throughout the detailed description, the variable A always refers to an advertiser, and the variable M always refers to a market. Since every quantity except for BUDGET[A] and LAMBDA[A] depends on the current market M, the figures typically omit M in order to enhance their readability. Similarly, the figures do not show error conditions, or floating point boundary conditions, or opportunities for caching or optimization. An ordinarily skilled practitioner will have no trouble interpreting the pseudocode and writing an efficient computer program that implements it.

The embodiments described herein may be implemented as computer readable program code for operating one or more processing devices and associated data storage equipment. In one particular embodiment, the disclosed method and apparatus may be implemented as C++ program code for controlling a database management system or search engine. In other embodiment, the method and apparatus may be implemented as a data storage medium storing computer readable program code, a data processing apparatus performing the functionality described herein or any other suitable device.

FIG. 1 shows one embodiment of the top level method. The method in this embodiment is a loop that first solves for the zero and a traffic constraint in each market, and then solves the budget constraints. The loop terminates when the function IS_SOLVED indicates that the current solution satisfies all constraints. In the final step the algorithm records each advertiser's optimal spending in the output variables SPEND[A, M].

Figure 2:
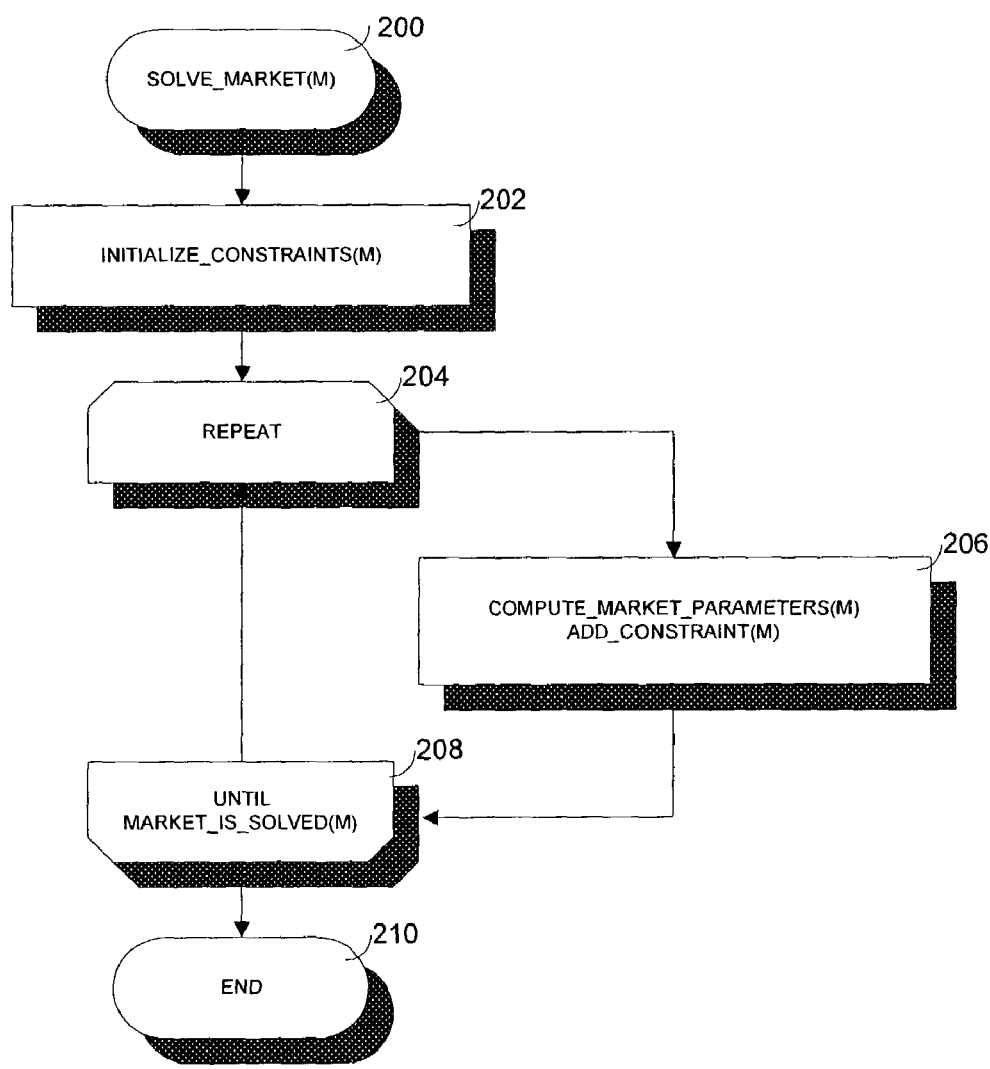
Figure 9:
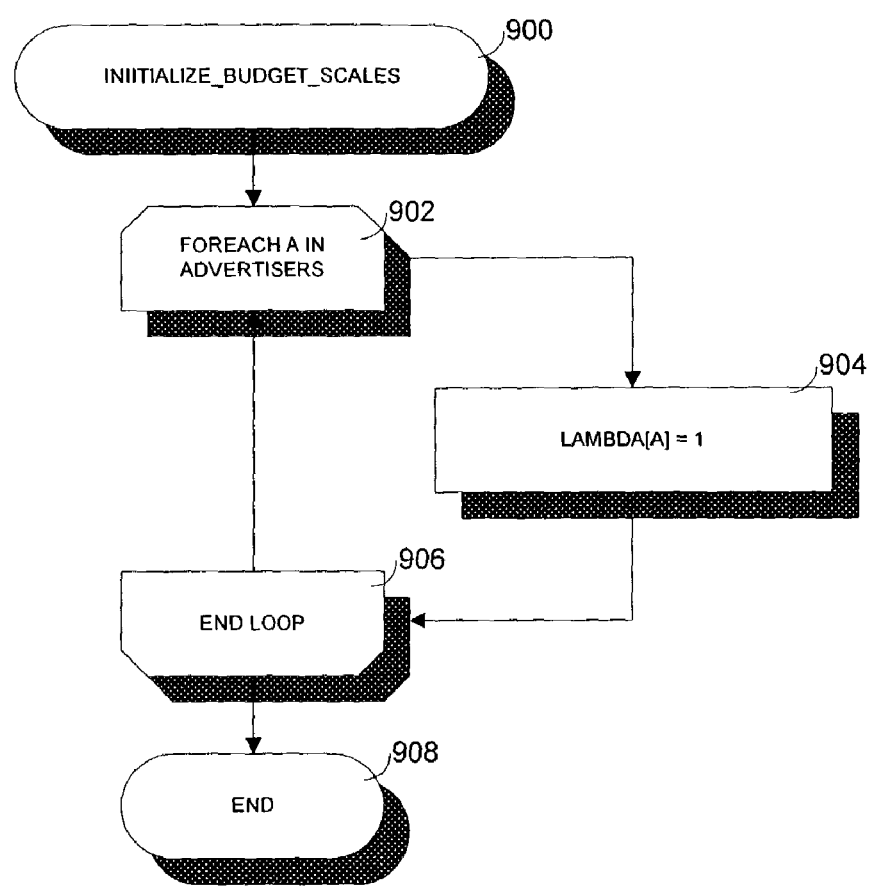
Figure 10:
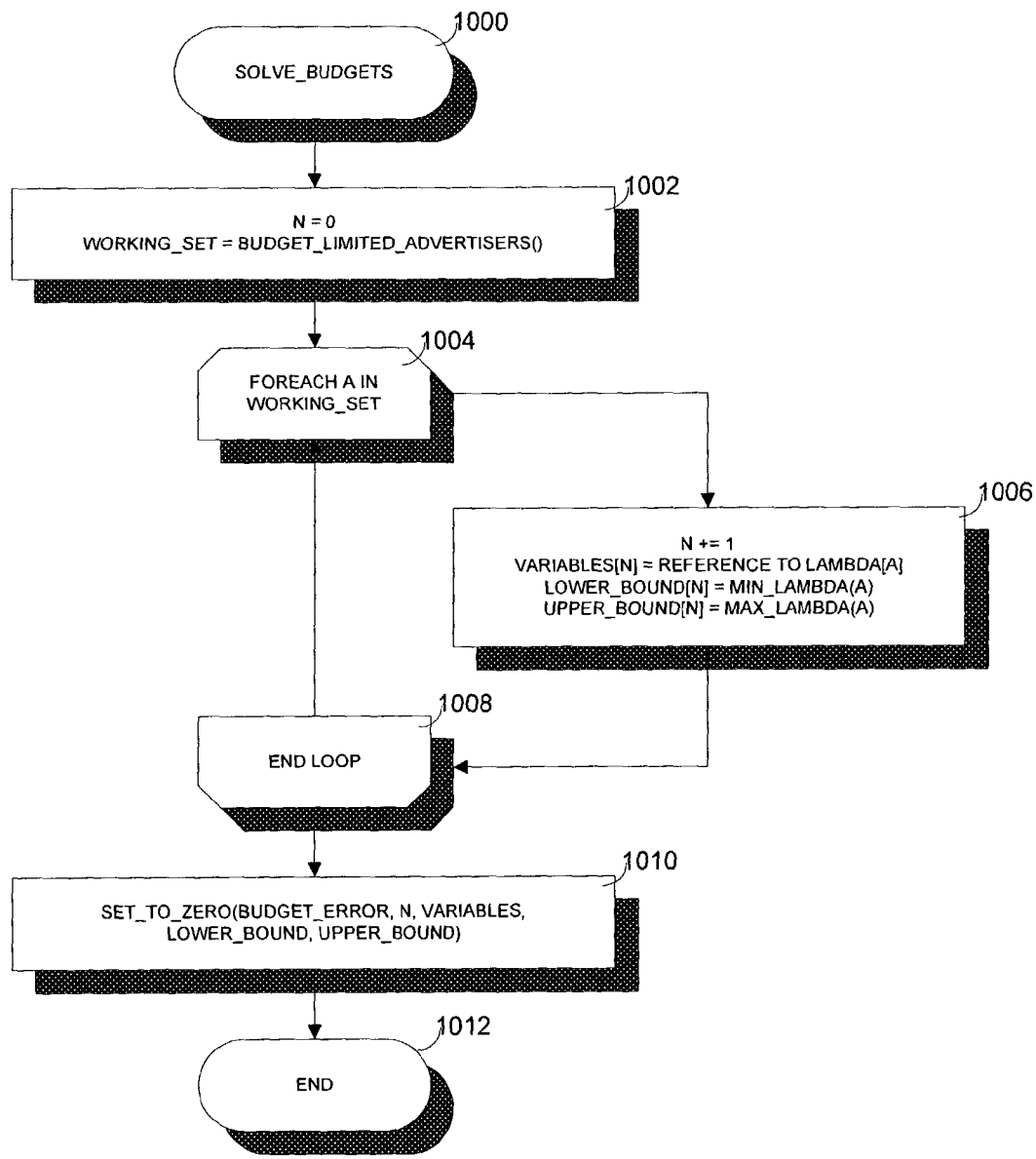
Figure 17:
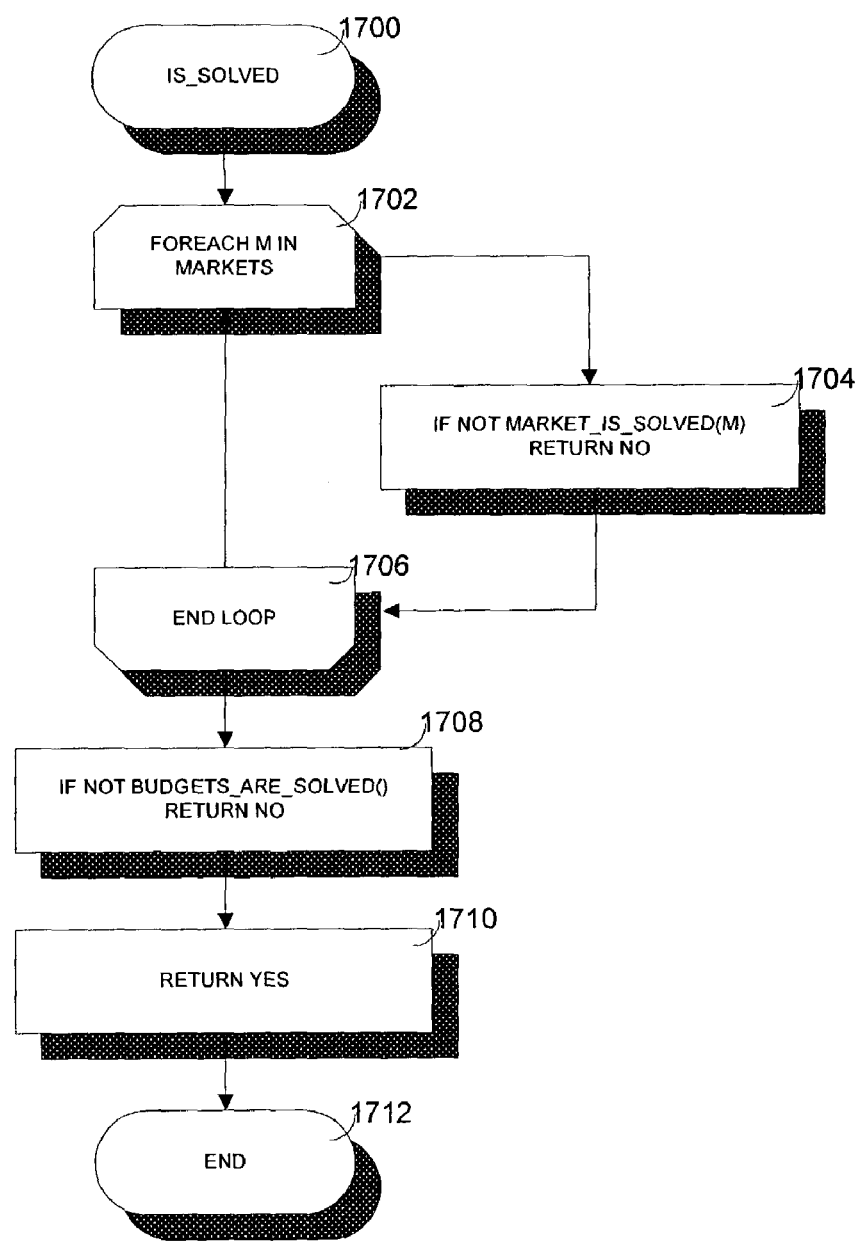
Figure 18:
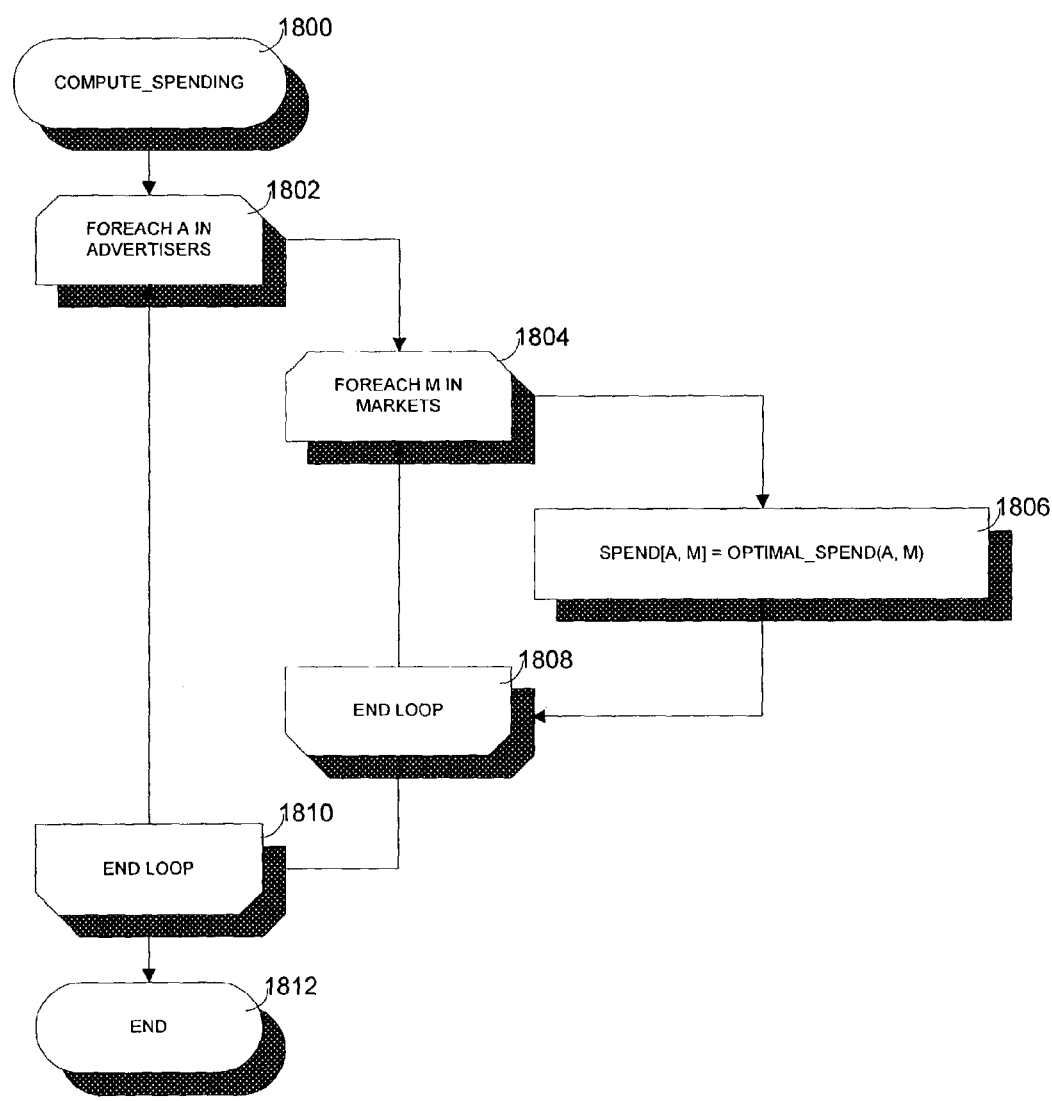

The top level method is a procedure labeled Solve which begins at block 100. At block 102, a procedure INITIALIZE_BUDGET_SCALES is called. This procedure initializes the advertiser's budget scale factors, lambda. One embodiment of this procedure is shown in FIG. 9. A loop begins at block 104. At block 106, a looping variable is initialized. At block 108, a procedure SOLVE_MARKET is called. One embodiment of this procedure is shown in FIG. 2. This procedure satisfies the zero and traffic constraints in a market. Looping continues at block 110 until all markets M are processed. At block 112, the loop is exited and a procedure SOLVE_BUDGETS is called. One embodiment of this procedure is shown in FIG. 10. This procedure satisfies each advertiser's budget constraint. The loop including blocks 104, 106, 108, 110, 112 and 114 continues processing until the procedure IS_SOLVED returns a true value. One embodiment of this procedure is shown in FIG. 17. This procedure determines if all zero, traffic and budget constraints are solved. If not, control returns to block 104. If so, at block 116, a procedure COMPUTE_SPENDING is called. This procedure computes each advertiser's optimal spending. One embodiment of this procedure is shown in FIG. 18. The procedure Solve then ends at block 118.

FIGS. 2-8 show the steps to solve for the zero and traffic constraints. The outputs are the CONSTRAINT[A, M] values that indicate whether an advertiser is zero constrained, traffic constrained, or unconstrained in a market. The top level loop is in FIG. 2. The algorithm first initializes all of the constraints in the current market to NONE, and then iteratively adds constraints until MARKET_IS_SOLVED indicates that the current solution is valid. During each iteration the algorithm calls COMPUTE_MARKET_PARAMETERS to calculate the quantities in Equations 7-12 that characterize a market.

Figure 3:
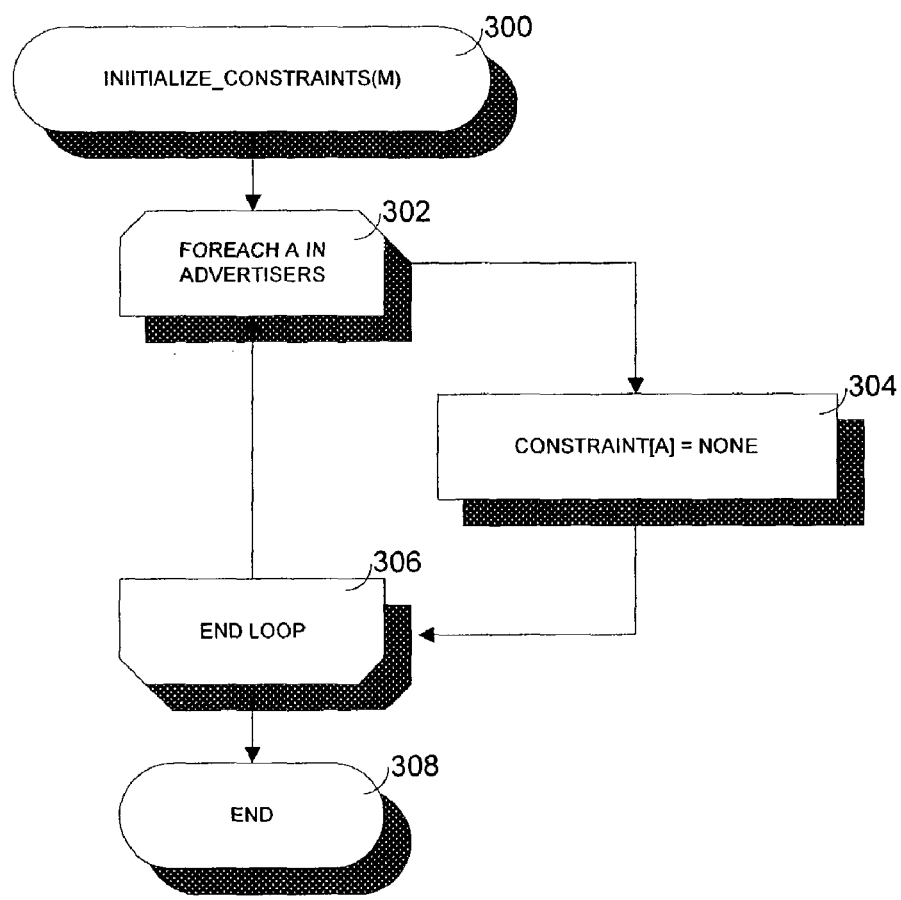
Figure 4:
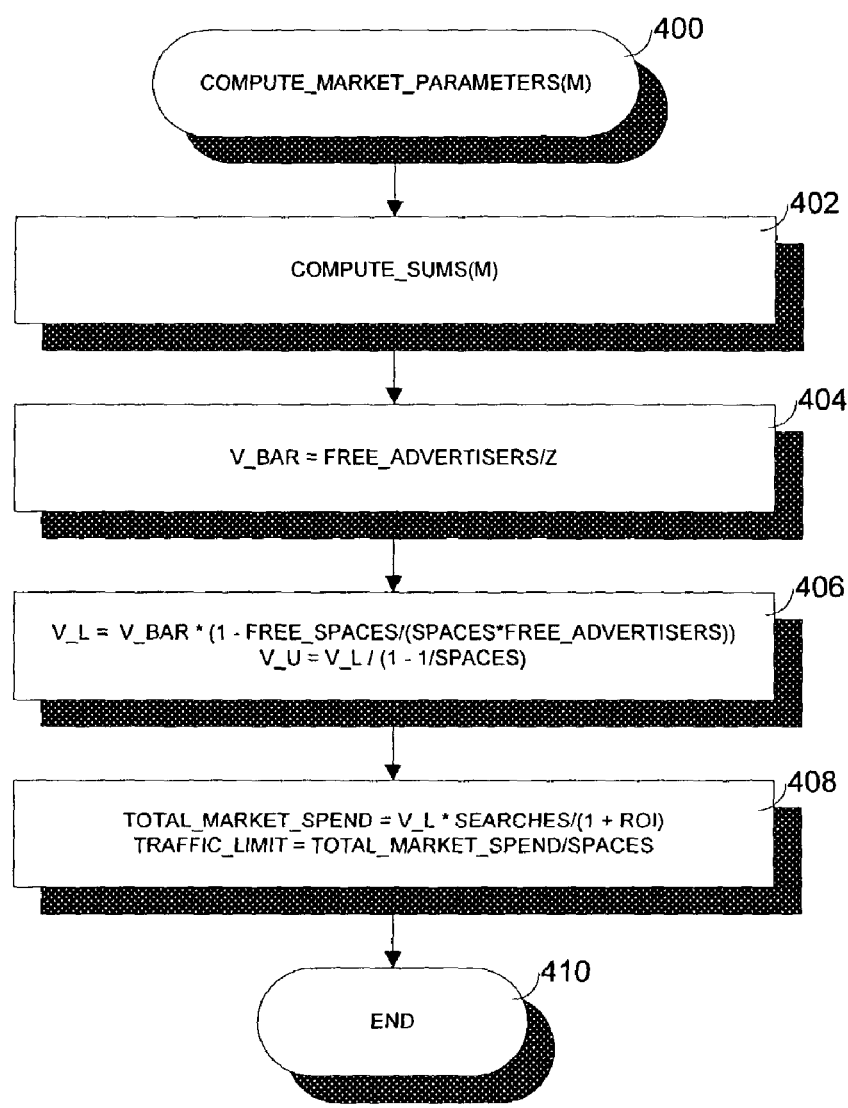
Figure 6:
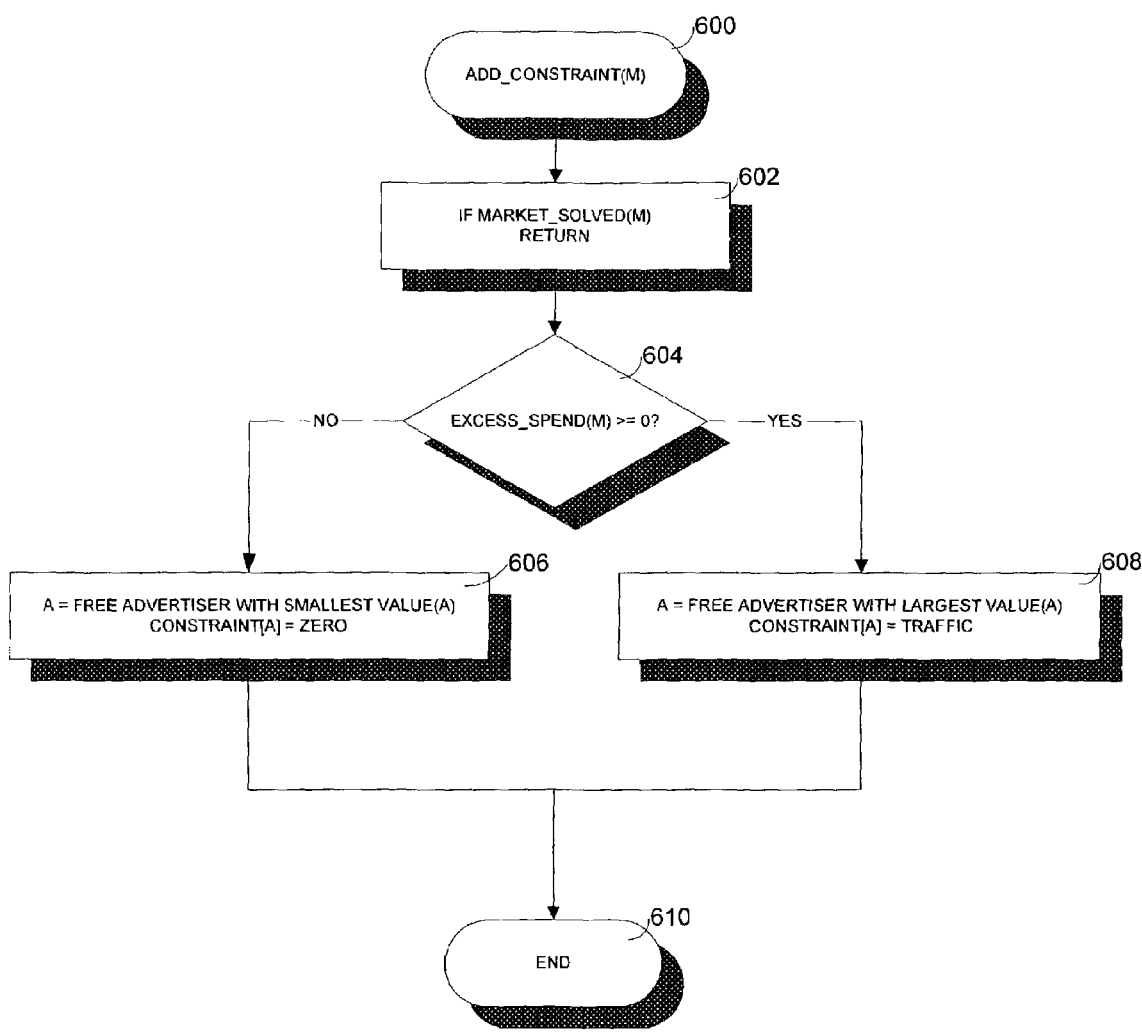
Figure 8:
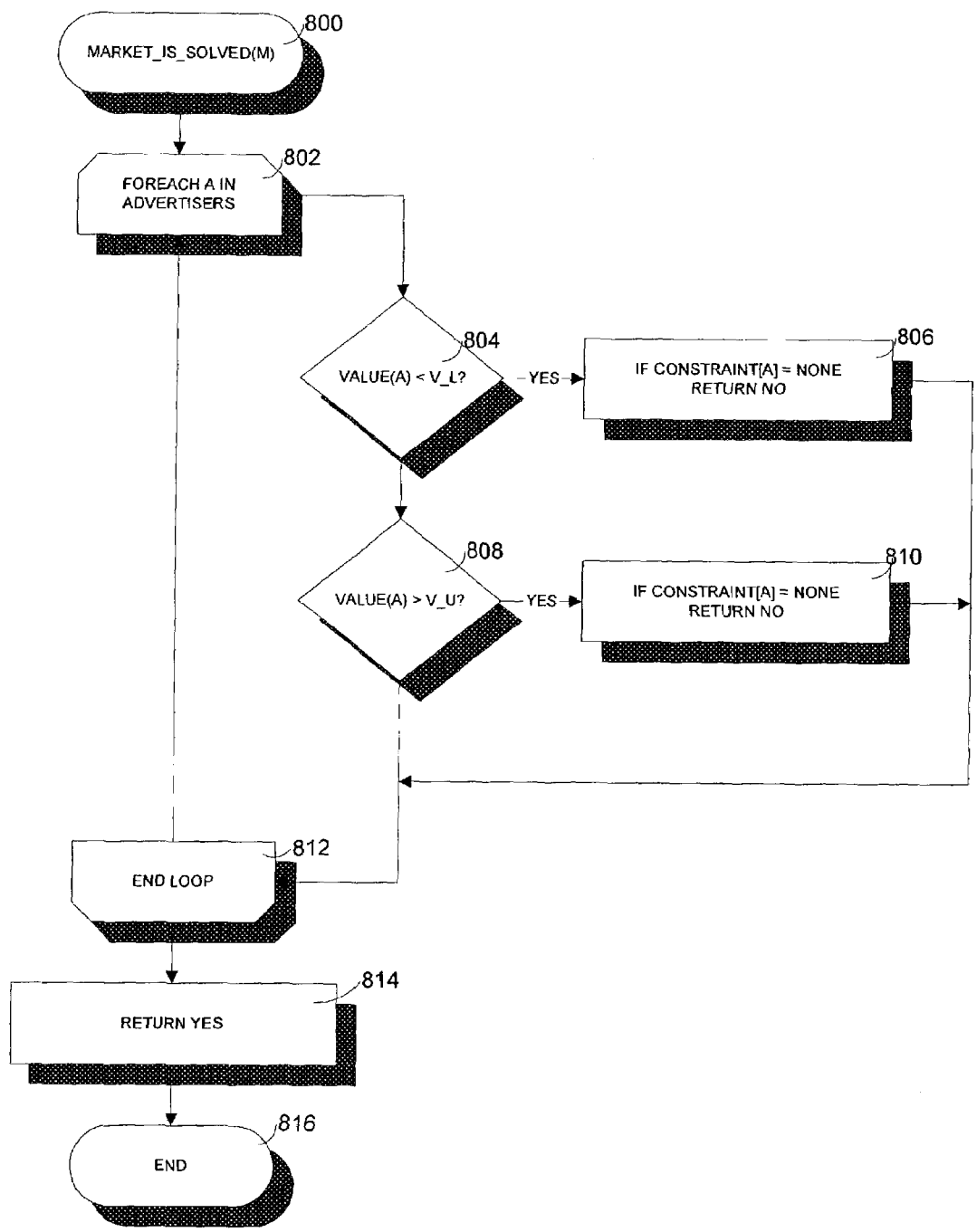

FIG. 2 is a flow diagram illustrating one embodiment of the procedure SOLVE_MARKET. The procedure begins at block 200. At block 202, a procedure INITIALIZE_CONSTRAINTS is called. One embodiment of this procedure is shown in FIG. 3. This procedure initializes advertiser constraints in a market. Next, a loop is entered at block 204. At block 206, a procedure COMPUTE_MARKET_PARAMETERS is called. This procedure computes the various quantities that constitute a market. One embodiment of this procedure is shown in FIG. 4. Also at block 206, a procedure ADD_CONSTRAINT is called. This procedure adds the most significant traffic or a zero constant to a market. One embodiment of this procedure is shown in FIG. 6. At block 208, the value returned by a procedure MARKET_IS_SOLVED is tested. One embodiment of this procedure is shown in FIG. 8. This procedure determines if all of a market's zero and traffic constraints are solved. If this procedure does not return a true value, the looping operation continues. Otherwise, the procedure SOLVE_MARKET ends at block 210.

FIG. 3 shows the algorithm to initialize the market constraints. The algorithm is a loop that sets each advertiser's constraint to NONE. The procedure INITIALIZE_CONSTRAINTS begins at block 300. A loop is entered at block 302. For each of the advertisers under consideration, at block 304 the value of the array Constraint indexed by the advertiser is initialized to the value NONE. Looping continues at block 306 until all advertisers have been processed. The procedure ends at block 308.

Figure 5:
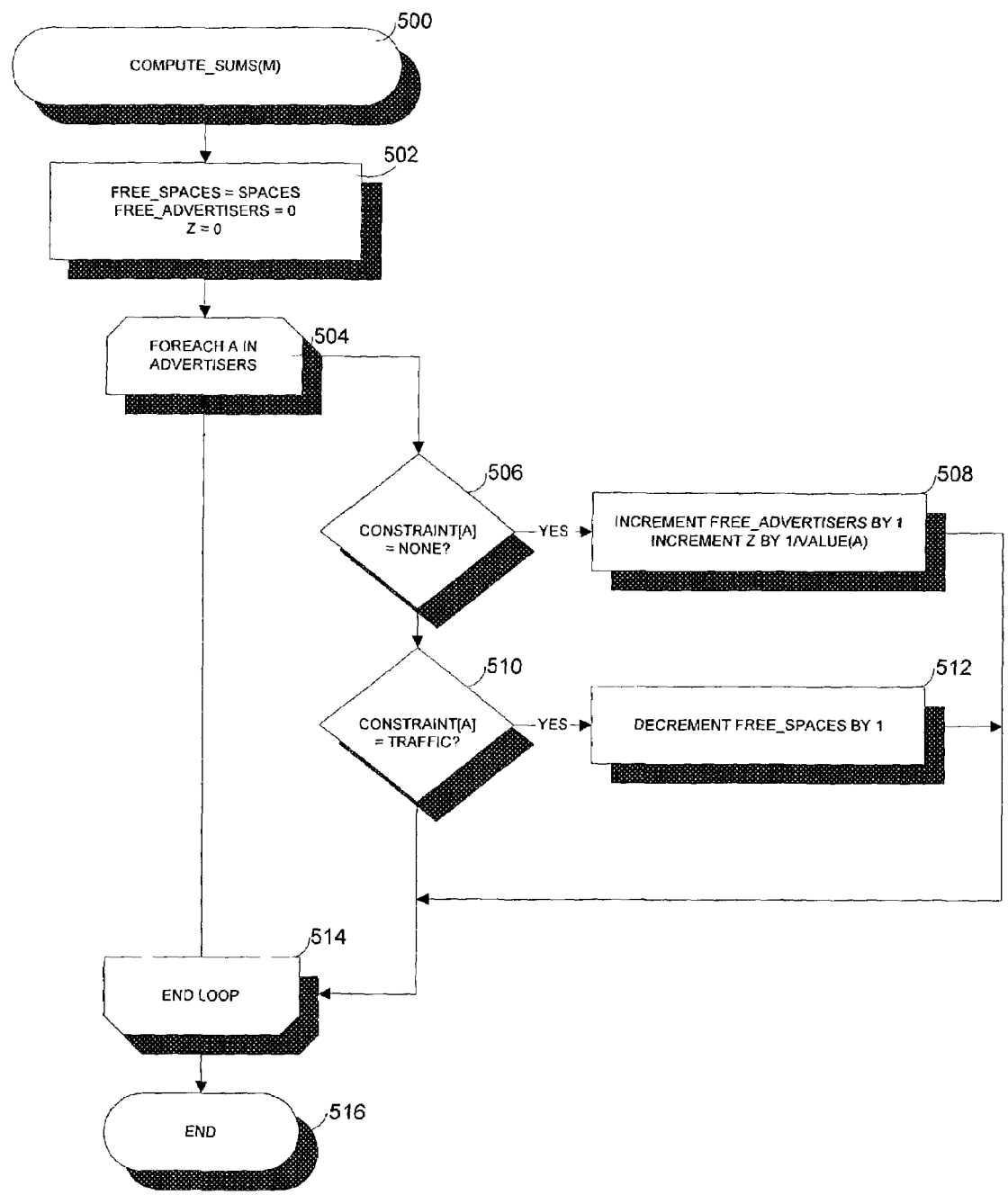

FIG. 4 shows one embodiment of a method to compute the various market parameters given by Equations 7-12. The method begins at block 400. At block 402, a procedure COMPUTE_SUMS is called. COMPUTE_SUMS calculates the preliminary quantities FREE_SPACES, FREE_ADVERTISERS, and Z, the denominator of the harmonic mean value given in Equation 10. These quantities appear in the remaining formulas. The method uses the formula for V_L given by Equation 12, but it could equally well use the more general Equation 16 if some advertisers adjust their spending manually. One embodiment of the procedure COMPUTE_SUMS is shown in FIG. 5. At block 404, the value of V_Bar is calculated and at block 406, a value V_L is calculated. At block 408, a value of the variable TOTAL_MARKET_SPEND is defined. The method ends at block 410.

FIG. 5 shows one embodiment of a procedure to compute FREE_ADVERTISERS, FREE_SPACES, and Z. FREE_ADVERTISERS counts the number of unconstrained advertisers; FREE_SPACES counts the number of free spaces on the search results page that are not taken up by traffic constrained advertisers; Z is the sum of each free advertiser's reciprocal market value. The procedure computes these quantities using a loop over all advertisers.

The procedure begins at block 500. At block 503, FREE_ADVERTISERS, FREE_SPACES, and Z are initialized. At block 504, a loop is entered using the advertiser as a looping index. At block 606, it is determined if the constraint for an advertiser is equal to NONE. If so, at block 508 the values of FREE_ADVERTISERS and Z are incremented. Control then proceeds to block 514. Otherwise, if the value of Constraint for the advertiser is equal to Traffic, block 510, then at block 512 the value of Free_Spaces is decremented. At block 514, the looping operation continues until all advertisers have been processed. The procedure then ends at block 516.

FIG. 6 shows the algorithm to add the most significant traffic or zero constraint to the CONSTRAINT[A, M] values. There is nothing to do if the market is solved. Otherwise, the algorithm adds either a zero constraint or a traffic constraint depending on the sign of EXCESS_SPEND. If the excess spend is negative, the algorithm adds a zero constraint for the free advertiser with the smallest market value. If the excess spend is zero or positive, the algorithm adds a traffic constraint for the free advertiser with the largest market value.

Figure 7:
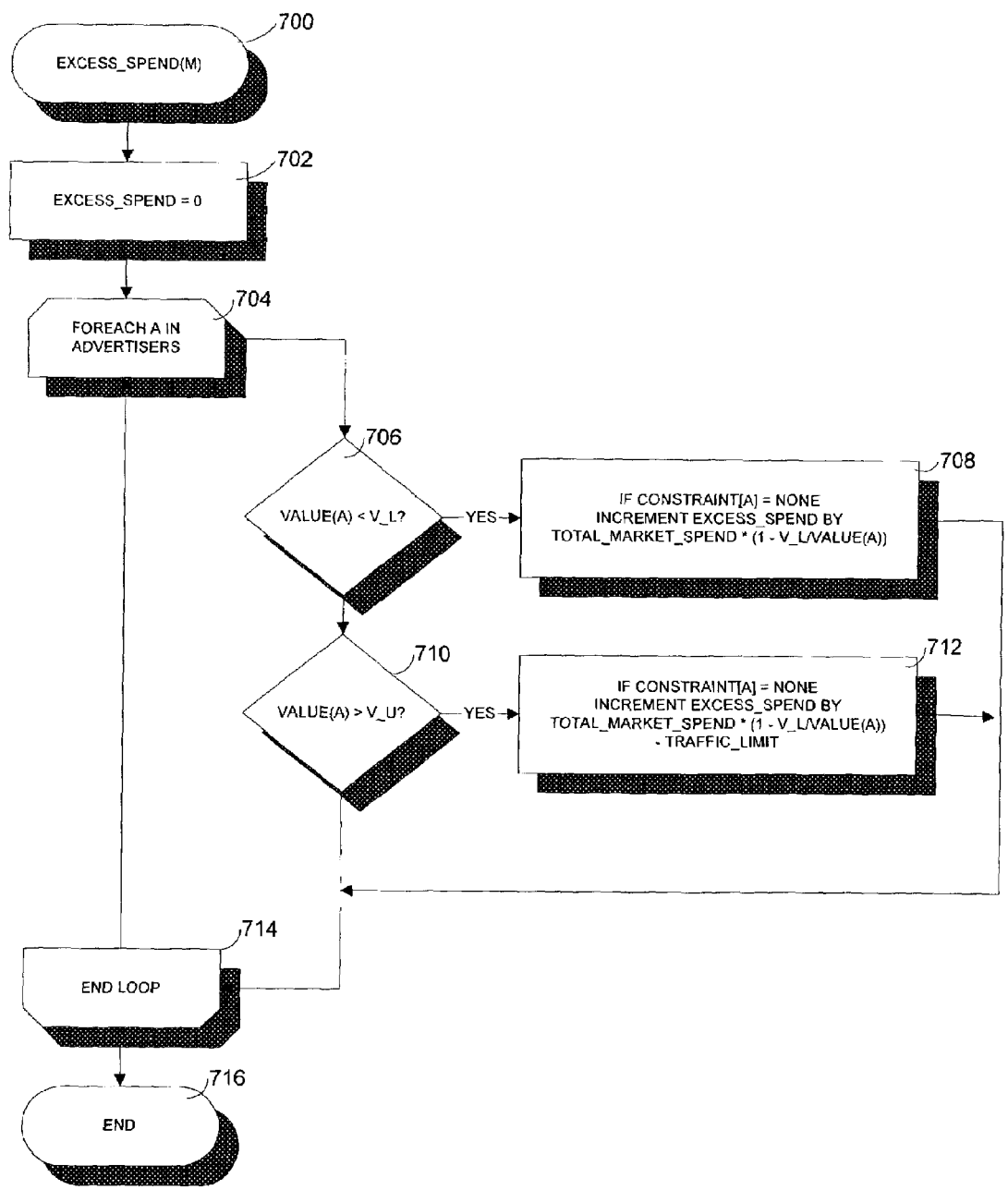

The procedure begins at block 600. At block 602, the procedure tests if the market is solved by calling procedure MARKET_SOLVED. One embodiment of this procedure is shown in FIG. 8. If the market is solved, the procedure ends and control returns to the calling process. If not, at block 604, a procedure EXCESS_SPEND is called. One embodiment of this procedure is shown in FIG. 7. If the value returned by EXCESS_SPEND is less than zero, at block 606 the algorithm adds a zero constraint for the free advertiser A with the smallest market value. If the value returned by EXCESS_SPEND is zero or positive, at block 608 the algorithm adds a traffic constraint for the free advertiser A with the largest market value. The procedure ends at block 610.

FIG. 7 shows the algorithm to compute the total signed excess spend given by Equation 13 above. It keeps a running total of the excess spend, adding in the amount from every advertiser that has a value less than V_L or greater than V_U. The algorithm ignores any advertiser that is zero constrained or traffic constrained.

The procedure begins at block 700. At block 702, the value of the variable EXCESS_SPEND is initialized to 0. A looping operation is initiated at block 704 using the advertiser A as a looping index. In the loop, at block 706, it is determined if the value for the currently indexed advertiser A is less than V_L, the lowest possible free value. If so, at block 708, if there is no constraint for the advertiser A, the variable EXCESS_SPEND in incremented by the value shown in FIG. 7 block 708. Control then proceeds to block 714. If, at block 710, the value for the currently indexed advertiser A is greater than V_U, the largest possible free value, control proceeds to block 712. There, if there is no constraint for the advertiser A the value of EXCESS_SPEND is incremented by the value shown in FIG. 7 block 712. Control then proceeds to block 714. The looping operation is repeated until all advertisers have been processed. The procedure ends at block 716.

FIG. 8 shows the algorithm to determine whether the current CONSTRAINT[A, M] values are a valid solution. For each free advertiser, the algorithm checks to see if his value is either less than the lowest possible free value V_L, or greater than the largest possible free value V_U. The current solution is valid only if all of the free advertisers fall within these bounds.

The procedure begins at block 800. At block 802, a looping operation is initiated using advertiser A as an index. At block 804, the value for the advertiser A is compared with V_L. If the value is less than V_L, at block 806 the value NO is returned by the procedure if there is no constraint for the advertiser A. Control proceeds to block 812. If the value for the advertiser A is not less than V_L at block 804, at block 808 this value is tested against V_U. If it exceeds V_U, at block 810, the procedure returns the value NO if there no constraint for the advertiser A. Control proceeds to block 812. If additional advertisers remain, the looping operation continues at block 802. If all advertisers have been processed without returning the value NO for the procedure, control exits the loop and at block 814 the procedure returns the value YES, indicated that the market has been solved. The procedure ends at block 816.

FIG. 9 shows the algorithm to initialize the budget scale factors. The algorithm is a loop that sets each advertiser's budget scale factor to 1. The procedure is called once at the beginning of the SOLVE algorithm.

The procedure begins at block 900. At block 902, a looping operation is entered using the advertiser A as the looping index. At block 904, the budget scale factor LAMBDA for the advertiser is initialized to a value of 1. At block 906, the looping operation continues until all advertisers have been processed. The procedure then ends at block 908.

FIGS. 10-15 show the steps to solve for the budget scale factors LAMBDA[A]. The top level algorithm is in FIG. 10. The algorithm begins by computing the working set of advertisers that are at their budget limit. It then creates a vector of variables to pass to the equation solver, with one variable for each advertiser in the working set. Each variable has an associated upper and lower bound. The SET_TO_ZERO function is an external equation solver that adjusts the LAMBA[A] values so that each advertiser's total spending exactly matches his budget. Any equation solver will work as long as it is capable of solving a system of non-linear equations with bound constraints. The input to the equation solver is the vector objective function BUDGET_ERROR, the number of variables N, the vector of variables to adjust, aDnd the bound constraints. As it runs, SET_TO_ZERO calls BUDGET_ERROR(I) to evaluate the $I^{th}$ component of the objective function. If it finds a solution, it finishes with BUDGET_ERROR (I) equal to zero for every I. If there is no solution, it finishes with one or more of the LAMBDA[A] values at their upper bound, and the algorithm removes the corresponding advertisers from the working set at the next iteration.

Figure 12:
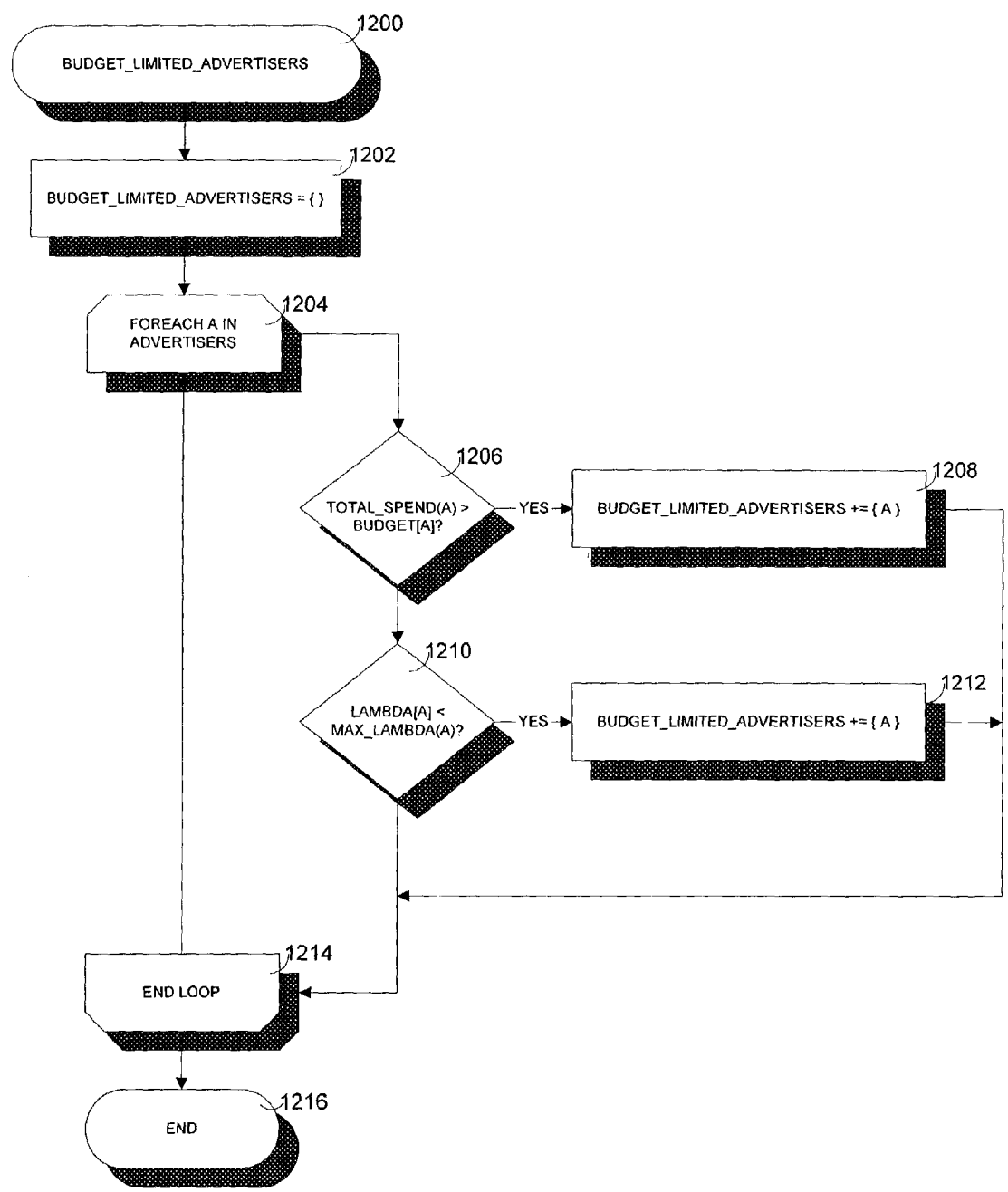
Figure 13:
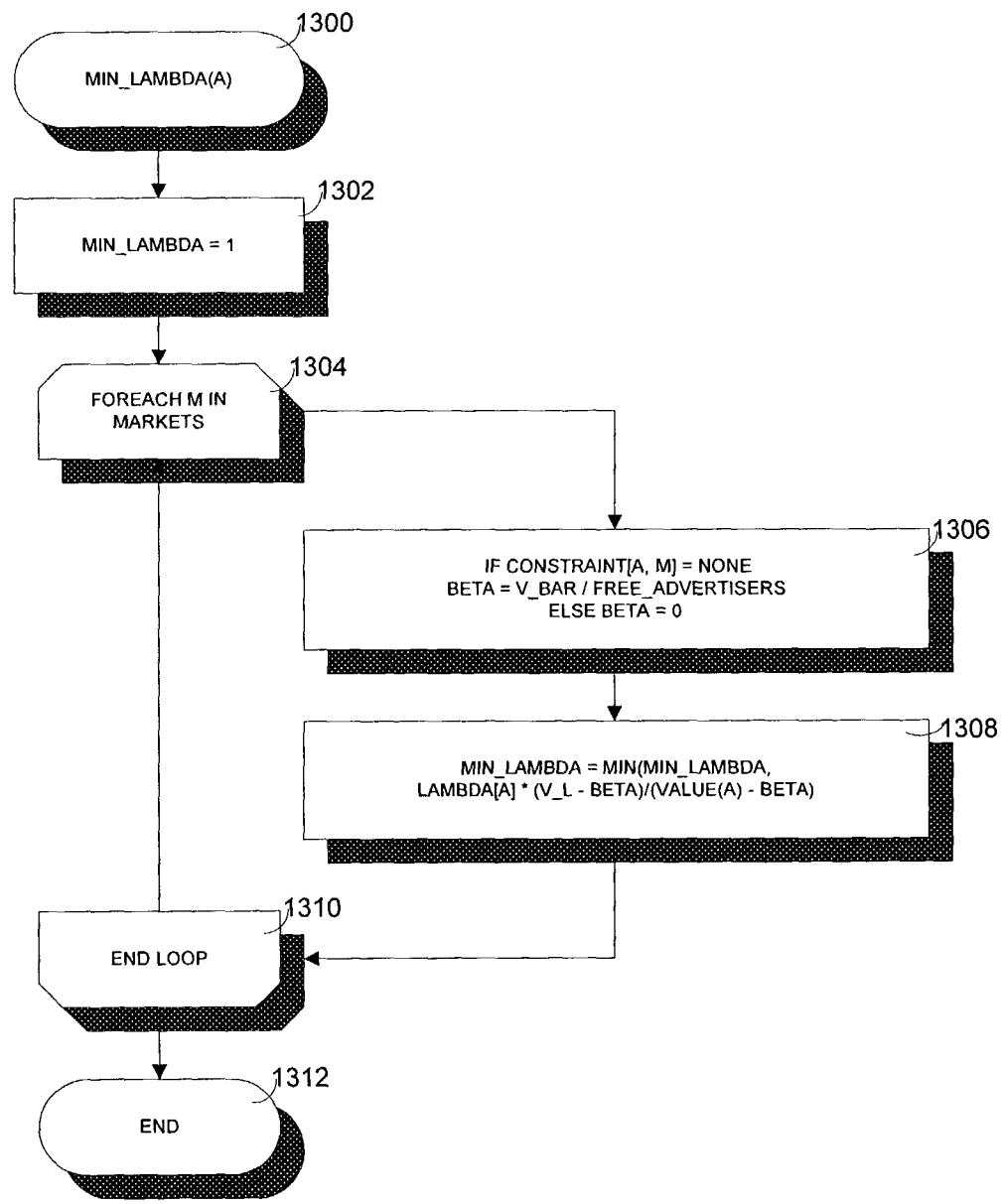
Figure 14:
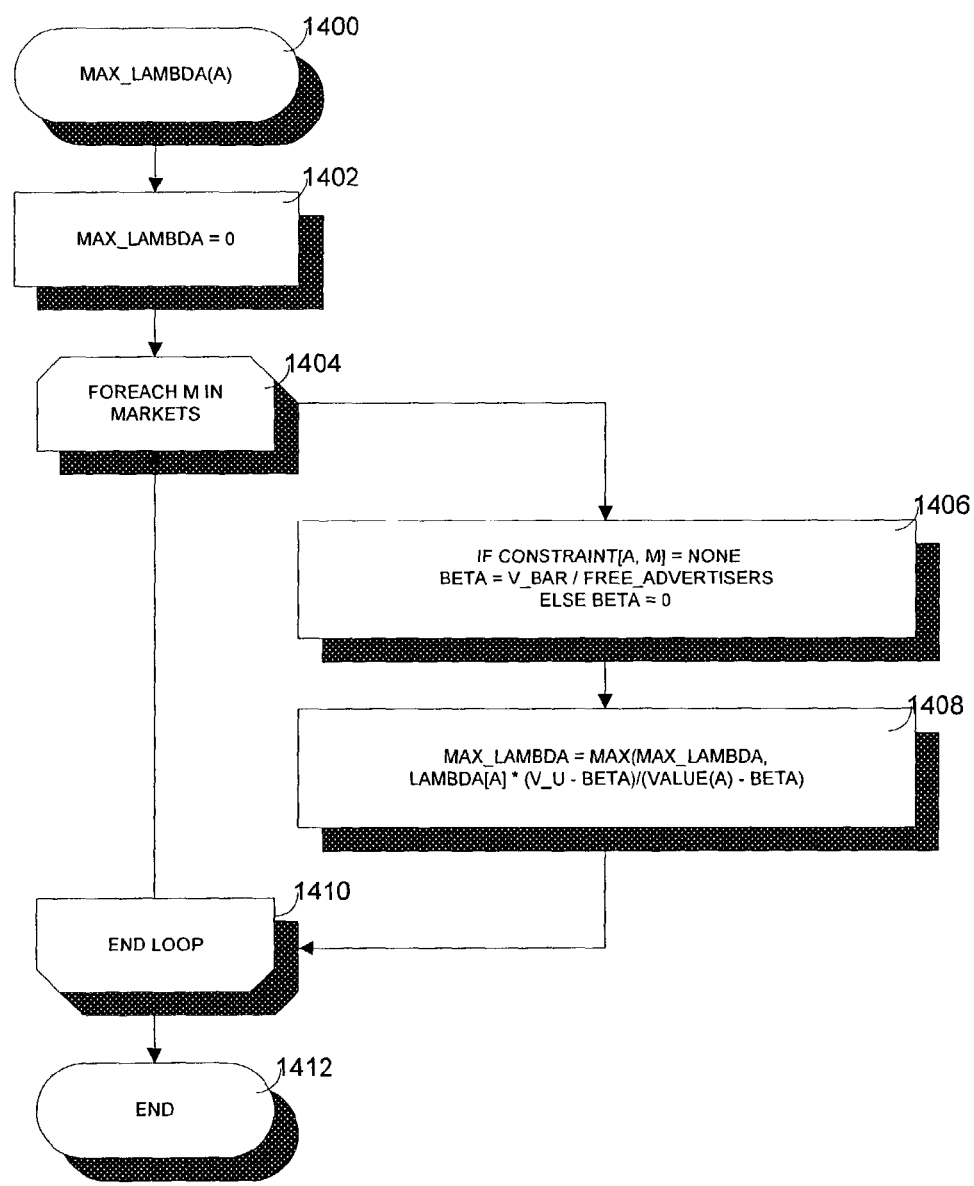

FIG. 10 illustrates one embodiment of a procedure SOLVE_BUDGETS to solve for a budget scale factor. The procedure begins at block 1000. At block 1002, the variable N is initialized to 0 and the variable WORKING_SET is set equal to the result of a procedure BUDGET_LIMITED_ADVERTISERS. One embodiment of this procedure is shown in FIG. 12. At block 1004, a looping operation is initiated using the advertisers A as the looping index. At block 1006, the variable N is incremented, the entry in the vector VARIABLES indexed by the variable N is set equal to a reference to the entry in the vector LAMBDA for the current advertiser. A procedure MIN_LAMBDA is called to determine a value for the variable LOWER_BOUND MIN_LAMBDA computes the currently indexed advertiser's minimum lambda before the advertiser is zero-constrained everywhere. One embodiment of this procedure is shown in FIG. 13. Then a procedure MAX_LAMBDA is used to determine a value for the variable UPPER_BOUND MAX_LAMBDA computes the currently-indexed advertiser's maximum lambda before he is traffic constrained everywhere. One embodiment of this procedure is shown in FIG. 14. At block 1008, the looping operation continues until all advertisers A have been processed.

Figure 11:
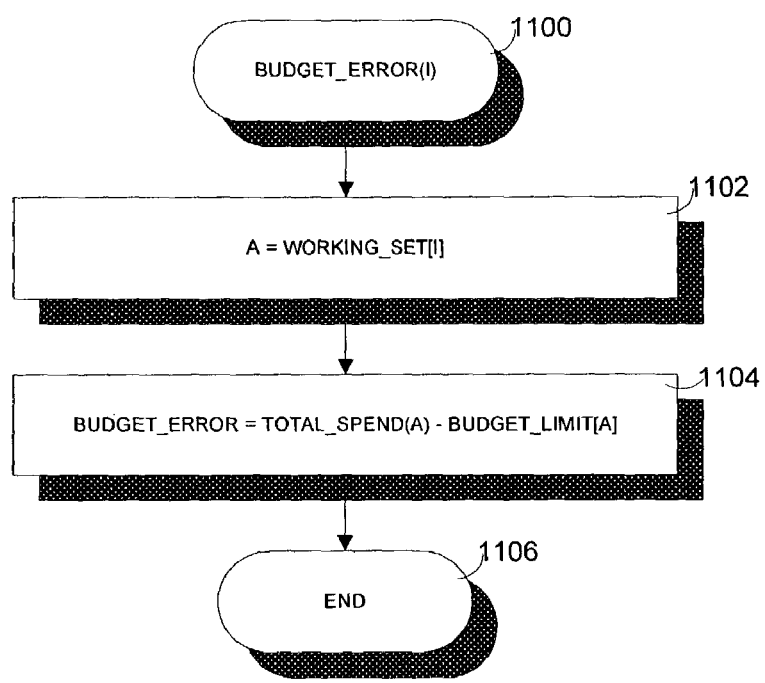

After completing the looping operation, at block 1010, the procedure SET_TO_ZERO is called to solve the system of equations defined by the input, the function BUDGET_ERROR, as described above. One embodiment of this function is shown in FIG. 11. The SOLVE_BUDGETS procedure ends at block 1012.

FIG. 11 shows the procedure to compute the amount that an advertiser in the working set is over or under budget. It retrieves the $I^{th}$ advertiser from the working set and returns the difference between his current total spend and his budget limit.

Figure 16:
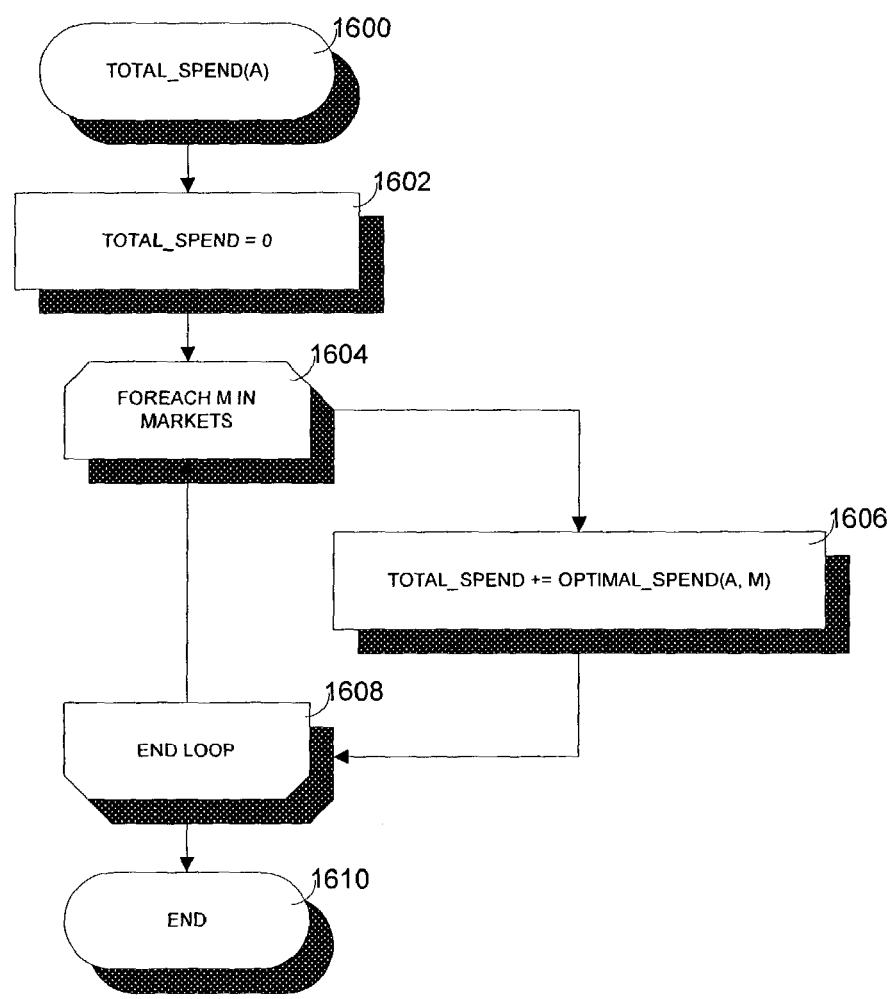

The procedure BUDGET_ERROR begins at block 1100. At block 1102, the $I^{th}$ advertiser is retrieved. At block 1104, the value of BUDGET ERROR is calculated as the difference between the result returned by the procedure TOTAL_SPEND and the BUDGET LIMIT for the advertiser A. One embodiment of the procedure TOTAL_SPEND is shown in FIG. 16. The procedure ends at block 1106.

FIG. 12 shows one embodiment of a procedure to compute the working set of advertisers that are at their budget limit. The working set includes all of the advertisers that are either over their budget or that have a LAMBDA[A] less than the maximum possible value. The algorithm adds every advertiser that satisfies one of these two budget limit conditions to the working set.

The procedure begins at block 1200. At block 1202, the variable BUDGET_LIMITED_ADVERTISERS is initialized. A looping operation is initialized at block 1204 using advertiser A as the looping index. At block 1206, it is determined if the current value of the procedure TOTAL_SPEND for the advertiser A exceeds the budget for the advertiser A. One embodiment of the procedure TOTAL_SPEND is shown in FIG. 16. If the condition tested at block 1206 is true, the value of the variable BUDGET_LIMITED_ADVERTISERS is incremented by the budget for advertiser A, block 1208. If not, at block 1210, it is determined if the value of lambda for the currently-indexed advertiser is less than the current value of MAX_LAMBDA for the advertiser A. One embodiment of the procedure MAX_LAMBDA is shown in FIG. 14. If so, at block 1212, the value of the variable BUDGET_LIMITED_ADVERTISERS is incremented by the budget for the advertiser A. Otherwise, control proceeds to block 1214.

At block 1214, if additional advertisers remain, control returns to block 1204. Otherwise, if all advertisers have been processed, the procedure ends at block 1216.

FIG. 13 shows one embodiment of a procedure to compute the minimum LAMBDA[A] that an advertiser can have before his optimal spend becomes negative in every market. For each market, the algorithm calculates the advertiser's minimum LAMBDA[A] using Equation 15. The minimum across all markets is the minimum value within any market.

The procedure begins at block 1300. At block 1302, the value of the variable MIN_LAMBDA is initialized to 1. A looping operation is entered at block 1304 using market M as the looping index. At blocks 1306, 1308, equation 15 above is implemented to determine the minimum lambda for the advertiser. At block 1310, if more markets remain to be processed, control returns to block 1304. Otherwise, the procedure ends at block 1312.

FIG. 14 shows one procedure to compute the maximum LAMBDA[A] that an advertiser can have before his optimal spend reaches the traffic limit in every market. For each market, the algorithm calculates the advertiser's maximum LAMBDA[A] using Equation 15. The maximum across all markets is the maximum value within any market.

The procedure begins at block 1400. At block 1402, the variable MAX_LAMBDA is initialized to 0. A looping operation begins at block 1404 using market M as a looping index. At blocks 1406, 1408, Equation 15 above is implemented to determine the maximum lambda for the advertiser. Looping continues at block 1410 until all markets have been processed. The procedure ends at block 1412.

Figure 15:
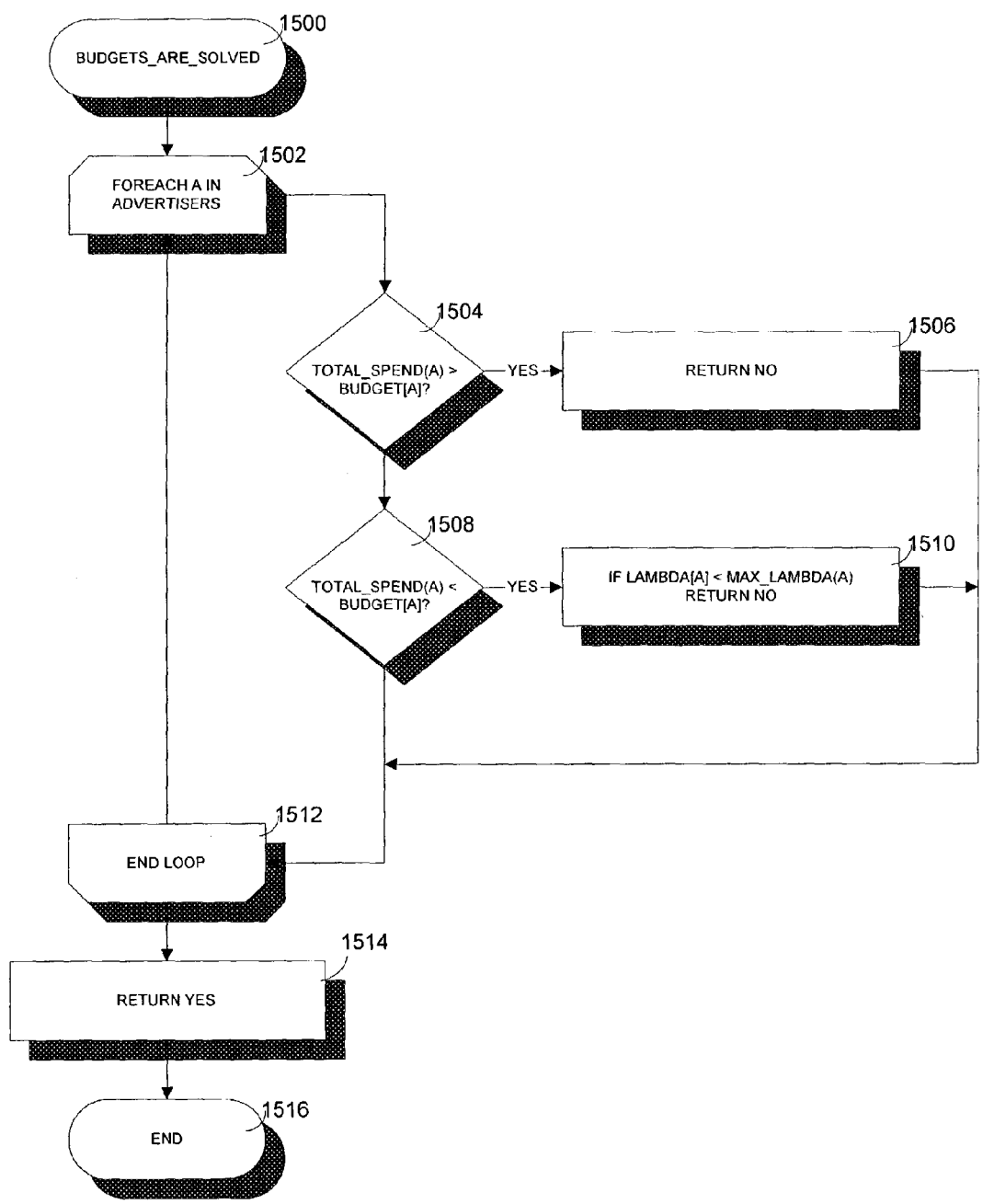

FIG. 15 illustrates one embodiment of a procedure BUDGETS_ARE_SOLVED to determine if there are any budget constraint violations. The algorithm checks to make sure that every advertiser has the largest possible value of LAMDA[A] without exceeding his budget. It returns YES only if all of the advertisers satisfy this condition.

The procedure begins at block 1502. Looping begins at block 1504 over each advertiser A. At block 1506, the result returned by the procedure TOTAL_SPEND for the advertiser A is compared with the advertiser A's budget. One embodiment of the procedure TOTAL_SPEND is shown in FIG. 16. If the result is greater than the budget, the procedure returns the value NO at block 1508. Otherwise, at block 1510, if the result returned by the procedure TOTAL_SPEND is less than the budget for the advertiser, at 1512 the value NO will be returned by the procedure if lambda for the advertiser is less than the value returned by the procedure MAX_LAMBDA for the advertiser. One embodiment of the procedure MAX_LAMBDA is shown in FIG. 15. Looping continues at block 1512 until all advertisers have been processed. If no advertiser returned the value NO during iteration through the loop, at block 1514 the value YES is returned and the procedure ends at block 1516.

FIG. 16 shows one embodiment of a procedure TOTAL_SPEND to compute an advertiser's total optimal spend across all markets. It uses OPTIMAL_SPEND(A, M) to compute the amount in each market and sums the results in a running total.

Figure 19:
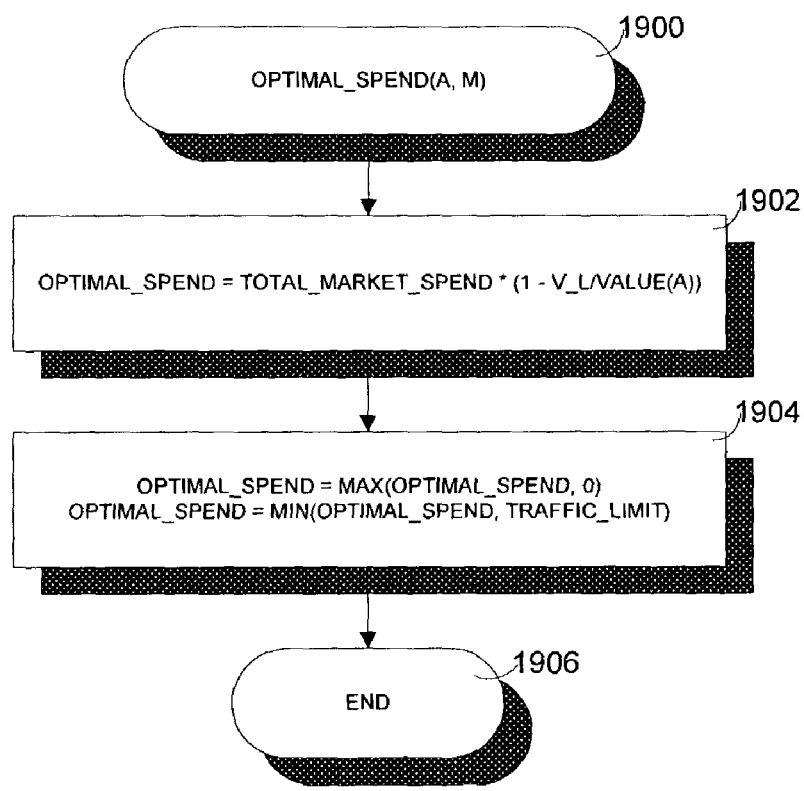

The procedure begins at block 1600. At block 1602, the value of the variable TOTAL_SPEND is initialized to 0. In a loop including blocks 1604, 1606, 1608, for each market M, the value of the variable TOTAL_SPEND is incremented by the result returned by the procedure OPTIMAL_SPEND. One embodiment of this procedure is shown in FIG. 19. After all markets have been processed, the procedure ends at block 1610.

FIG. 17 shows one embodiment of a procedure IS_SOLVED to determine whether the current CONSTRAINT[A, M] and LAMBDA[A] values satisfy all of the zero, traffic, and budget constraints. The algorithm first checks to make sure that every market satisfies its zero and traffic constraints; then it checks to make sure that every advertiser satisfies his budget constraint. The algorithm returns YES only if all of these conditions are true.

The procedure begins at block 1700. At block 1702, a loop using market M as the looping variable is entered. At block 1704, the value returned by the procedure MARKET_IS_SOLVED is tested. One embodiment of the procedure MARKET_IS_SOLVED is shown in FIG. 8. If the procedure returns a negative value, the procedure IS_SOLVED returns the value NO. Otherwise, at block 1706, looping continues to test another market M. Once all markets have been tested, the value returned by the procedure BUDGETS_ARE_SOLVED is tested. One embodiment of the procedure BUDGETS_ARE_SOLVED is shown in FIG. 15. If this procedure does not return a positive value, the procedure IS_SOLVED returns a value NO, 1708. Otherwise, block 1710, the procedure returns the value YES, block 1710. The procedure ends at block 1712.

FIG. 18 shows one embodiment of a procedure COMPUTE_SPENDING to record the final optimal spending amount for each advertiser in each market. The algorithm is a loop that sets each SPEND[A, M] value to the current value of OPTIMAL_SPEND(A, M).

The procedure begins at block 1700. At block 1702, an outer loop is entered using advertiser A as the looping variable. At block 1704, an inner loop is entered using market M as the looping variable. At block 1806, entries in the array SPEND are set to the current values returned by the procedure OPTIMAL_SPEND. One embodiment of this procedure is shown in FIG. 19. After all markets M have been processed for a value of an advertiser, A, the value of the advertiser as the looping variable for the outer loop is incremented. After all advertisers have been processed, the procedure ends at block 1812.

FIG. 19 shows one embodiment of a procedure OPTIMAL_SPEND to compute an advertiser's optimal spend in a single market using Equation 7. If the value is less than zero or greater than the traffic limit, the algorithm constrains it to the appropriate value.

The procedure begins at block 1900. At block 1902, a value for the variable OPTIMAL_SPEND is determined based on the TOTAL_SPEND for the advertiser in a market. One embodiment of a procedure TOTAL_SPEND for this operation is shown in FIG. 16. At block 1904, the result of OPTIMAL_SPEND is set to the greater of OPTIMAL_SPEND and 0 and the minimum of OPTIMAL_SPEND and TRAFFIC_LIMIT. The procedure ends at block 1906.

Figure 20:
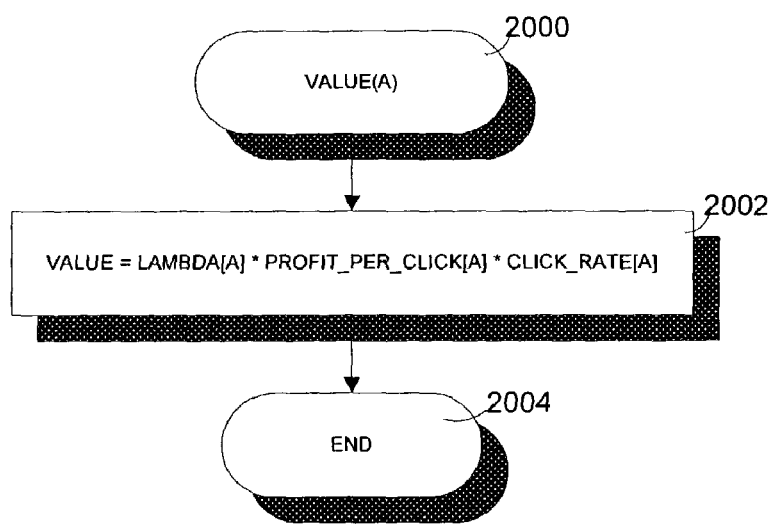
Figure 21:
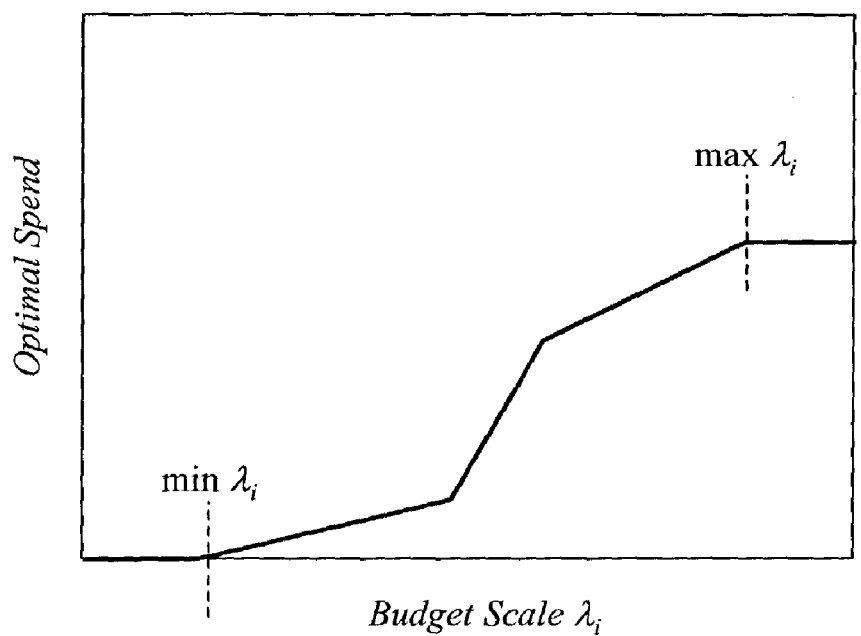
FIG. 21 is a plot showing an advertiser's total optimal spend varies as a function of advertiser's.

FIG. 20 shows one embodiment of a procedure to compute an advertiser's market value. The procedure begins at block 2000. The value VALUE is the product of the advertiser's budget scale factor lambda, his profit-per-click, and his click-through-rate. The profit-per-click, and his click-through-rate may be obtained from any convenient source.

Figure 22:
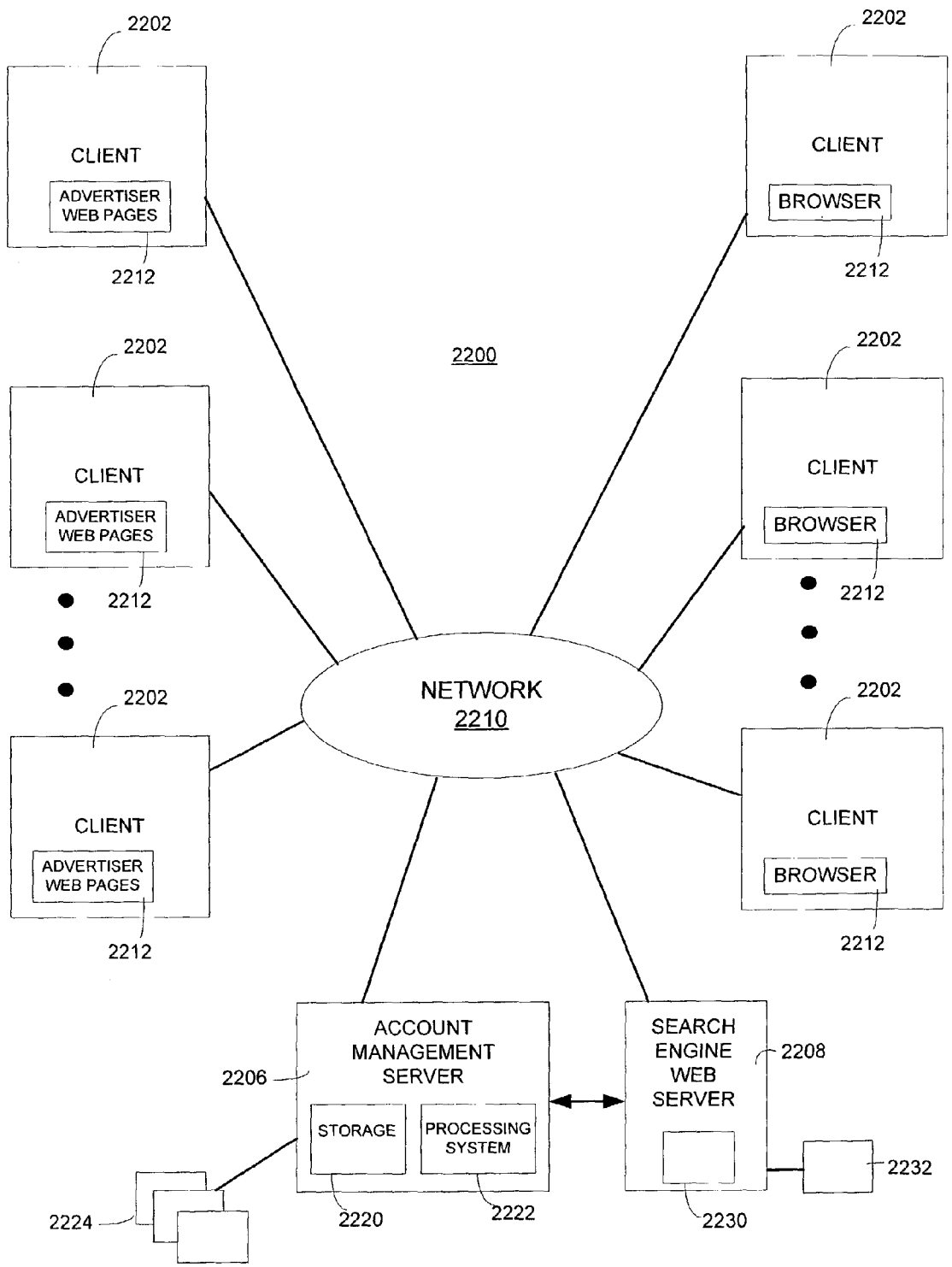
FIG. 22 is a block diagram illustrating one embodiment of a network including a computer database search system.

The block diagram of FIG. 22 therefore shows a distributed system 2200 comprising a plurality of client computers 2202, a plurality of advertiser web servers 2204, an account management server 2206, and a search engine web server 2208, all of which are connected to a network 22100. The network 2210 is hereinafter generally referred to as the Internet. Although the disclosed system and method is specifically useful for the Internet, it should be understood that the client computers 2202, advertiser web servers 2204, account management server 2206, and search engine web server 2208 may be connected together through one of a number of different types of networks. Such networks may include local area networks (LANs), other wide area networks (WANs), and regional networks accessed over telephone lines, such as commercial information services. The client and server processes may even comprise different programs executing simultaneously on a single computer.

The client computers 2202 can be conventional personal computers (PCs), workstations, or computer systems of any other size. Each client 2202 typically includes one or more processors, memories, input/output devices, and a network interface, such as a conventional modem. The advertiser web servers 2204, account management server 2206, and the search engine web server 2208 can be similarly configured. However, advertiser web servers 2204, account management server 2206, and search engine web server 2208 may each include many computers connected by a separate private network. In fact, the network 2210 may include hundreds of thousands of individual networks of computers.

The client computers 2202 can execute web browser programs 2212, such as the NAVIGATOR, EXPLORER, or MOSAIC browser programs, to locate the web pages or records 2214 stored on advertiser server 2204. The browser programs 2212 allow the users to enter addresses of specific web pages 2214 to be retrieved. These addresses are referred to as Uniform Resource Locators, or URLs. In addition, once a page has been retrieved, the browser programs 2212 can provide access to other pages or records when the user "clicks" on hyperlinks to other web pages. Such hyperlinks are located within the web pages 2214 and provide an automated way for the user to enter the URL of another page and to retrieve that page. The pages can be data records including as content plain textual information, or more complex digitally encoded multimedia content, such as software programs, graphics, audio signals, videos, and so forth.

In one embodiment, client computers 2202 communicate through the network 2210 with various network information providers, including account management server 2206, search engine server 2208, and advertiser servers 2204 using the functionality provided by a HyperText Transfer Protocol (HTTP), although other communications protocols, such as FTP, SNMP, TELNET, and a number of other protocols known in the art, may be used. Preferably, search engine server 2208, account management server 2206, and advertiser servers 2204 are located on the World Wide Web.

As discussed above, at least two types of server are contemplated in embodiments. The first server contemplated is an account management server 2206 comprising a computer storage medium 2220 and a processing system 2222. A database 2224 is stored on the storage medium 2220 of the account management server 2206. The database 2224 contains advertiser account information, including in one embodiment advertiser subscription account information. It will be appreciated from the description herein that the system and method disclosed herein may be implemented in software that is stored as executable instructions on a computer storage medium, such as memories or mass storage devices, on the account management server 2206. Conventional browser programs 2212, running on client computers 2202, may be used to access advertiser account information stored on account management server 2206. Preferably, access to the account management server 2206 is accomplished through a firewall, not shown, which protects the account management and search result placement programs and the account information from external tampering. Additional security may be provided via enhancements to the standard communications protocols such as Secure HTTP or the Secure Sockets Layer.

The second server type contemplated is a search engine web server 2208. A search engine program permits network users or searchers, upon navigating to the search engine web server URL or sites on other web servers capable of submitting queries to the search engine web server 2208 through their browser program 2212, to type keyword queries to identify pages of interest among the millions of pages available on the World Wide Web. In one embodiment, the search engine web server 2208 generates a search result list that includes, at least in part, relevant entries obtained from and formatted by the results of the bidding process conducted by the account management server 2206. The search engine web server 2208 generates a list of hypertext links to documents that contain information relevant to search terms entered by the user at the client computer 2202. The search engine web server transmits this list, in the form of a web page, to the network user, where it is displayed on the browser 2212 running on the client computer 2202. One embodiment of the search engine web server may be found by navigating to the web page at URL http://www.overture.com/.

Search engine web server 2208 is connected to the Internet 2210. In one embodiment, search engine web server 2208 includes a search database 2230 comprised of search listing records used to generate search results in response to user queries. In addition, search engine web server 2208 may also be connected to the account management server 2206. Account management server 2206 may also be connected to the Internet. The search engine web server 2208 and the account management server 2206 address the different information needs of the users located at client computers 2202.

For example, one class of users located at client computers 2202 may be network information providers such as advertising web site promoters or advertisers having advertiser web pages 2214 located on advertiser web servers 2204. These advertising web site promoters, or advertisers, may wish to access account information residing in storage 2220 on account management server 2206. An advertising web site promoter may, through the account residing on the account management server 2206, participate in a competitive bidding process with other advertisers. An advertiser may bid on any number of search terms relevant to the content of the advertiser's web site. In one embodiment, the relevance of a bidded search term in a search listing to the corresponding web site may be evaluated using a computer program executing at processor 2222 of account management server 2206, where the computer program will evaluate the search term and corresponding web site according to a set of predefined editorial rules.

The higher bids receive more advantageous placement on the search result list page generated by the search engine 2208 when a search using the search term bid on by the advertiser is executed. In one embodiment, the amount bid by an advertiser comprises a money amount that is deducted from the account of the advertiser for each time the advertiser's web site is accessed via a hyperlink on the search result list page. In another embodiment, the subscription account of the advertiser is deducted by a predetermined amount each time a search listing of the advertiser is served or displayed to a searcher in response to a search query. A searcher "clicks" on the hyperlink with a computer input device to initiate a retrieval request to retrieve the information associated with the advertiser's hyperlink. Preferably, each access or "click" on a search result list hyperlink will be redirected to the search engine web server 2208 to associate the "click" with the account identifier for an advertiser. This redirect action, which is not apparent to the searcher, will access account identification information coded into the search result page before accessing the advertiser's URL using the search result list hyperlink clicked on by the searcher. In another embodiment, it may be this clickthrough operation to the advertiser's URL that causes deduction of the predetermined amount from the subscription account of the advertiser. The account identification information is recorded in the advertiser's account along with information from the retrieval request as a retrieval request event. Since the information obtained through this mechanism conclusively matches an account identifier with a URL in a manner not possible using conventional server system logs known in the art, accurate account debit records will be maintained. In some embodiments, the advertiser's web site description and hyperlink on the search result list page is accompanied by an indication that the advertiser's listing is a paid listing.

A second class of users at client computers 2202 may comprise searchers seeking specific information on the web. The searchers may access, through their browsers 2212, a search engine web page 2232 residing on web server 2208. The search engine web page 2232 includes a query box in which a searcher may type a search term comprising one or more keywords. Alternatively, the searcher may query the search engine web server 2208 through a query box hyperlinked to the search engine web server 2208 and located on a web page stored at a remote web server. When the searcher has finished entering the search term, the searcher may transmit the query to the search engine web server 2208 by clicking on a provided hyperlink. The search engine web server 2208 will then generate a search result list page and transmit this page to the searcher at the client computer 2202.

The searcher may click on the hypertext links associated with each listing on the search results page to access the corresponding web pages. The hypertext links may access web pages anywhere on the Internet, and include paid listings to advertiser web pages 2214 located on advertiser web servers 2204. In one embodiment, the search result list also includes non-paid listings that are not placed as a result of advertiser bids and are generated by a conventional World Wide Web search engine, such as the INKTOMI, LYCOS, or YAHOO! search engines. The non-paid hypertext links may also include links manually indexed into the database 2230 by an editorial team.

From the foregoing, it can be seen that the present embodiments provide method and apparatus for displaying advertisers' listings in proportion to the amount spent by the advertisers. Each advertiser decides how much money he wants to spend on a search term, and the search provider displays the advertisers' listings accordingly.

While a particular embodiment of the present invention has been shown and described, modifications may be made. It is therefore intended in the appended claims to cover such changes and modifications, which follow in the true spirit and scope of the invention.

It is therefore intended that the foregoing detailed description be regarded as illustrative rather than limiting, and that it be understood that it is the following claims, including all equivalents, that are intended to define the spirit and scope of this invention.

We claim:

1. A business method for a database search system in which searchers submit search queries to a database and receive search listings including at least some advertiser-sponsored search listings, the business method comprising:
    selling to respective advertisers a specified quantity of searcher engagements for a specified price; and
    subsequently, providing search listings of respective advertisers in response to search queries and in proportion to the respective advertisers' specified quantity of searcher engagements.
    receiving a search request;
    determining for each respective advertiser a respective discrepancy value related to a respective number of searcher engagements received and a respective number of searcher engagements the each respective advertiser should have received; and
    returning search listings according to the determined discrepancy value.

2. A business method for a database search system in which searchers submit search queries to a database and receive search listings including at least some advertiser-sponsored search listings, the business method comprising:
    selling to respective advertisers a specified quantity of searcher engagements for a specified price;
    subsequently, providing search listings of respective advertisers in response to search queries and in proportion to the respective advertisers' specified quantity of searcher engagements;
    determining at least one of a cost per click for a respective advertiser, and an estimated number of clicks for the respective advertiser;
    determining clickthrough rate for the respective advertiser based on historical data for a market implemented on the database search system; and
    estimating the clickthrough rate as a ratio of a number of clicks a search listing of the respective advertiser has received to the number of impressions the search listing has received.

3. A computer readable storage medium storing computer readable computer code configured to implement a method for a database search system in which searchers submit search queries to a database and receive search listings including at least some advertiser-sponsored search listings, the computer readable computer code comprising:
    first computer readable code for offering to respective advertisers a specified quantity of searcher engagements for a specified price, the searcher engagements including at least one of searcher impressions and searcher clickthroughs;
    second computer readable code for providing search listings of respective advertisers in response to subsequently received search queries and in proportion to the respective advertisers' specified quantity of searcher engagements; and
    third program code for optimizing a respective advertiser's advertising spend based on the advertiser's total advertising budget, the advertiser's profit per clickthrough and an external rate of return.

4. The computer readable storage medium of claim 3 further comprising:
fourth computer program code for determining a budget scale factor for the respective advertiser.

5. A computer readable storage medium storing computer readable computer code configured to implement a method for a database search system in which searchers submit search queries to a database and receive search listings including at least some advertiser-sponsored search listings, the computer readable computer code comprising:
first computer readable code for offering to respective advertisers a specified quantity of searcher engagements for a specified price, the searcher engagements including at least one of searcher impressions and searcher clickthroughs;
second computer readable code for providing search listings of respective advertisers in response to subsequently received search queries and in proportion to the respective advertisers' specified quantity of searcher engagements;
third program code for optimizing a respective advertiser's advertising spend based on the advertiser's total advertising budget, the advertiser's profit per clickthrough and an external rate of return; and
fourth computer program code for determining a budget scale factor for the respective advertiser,
wherein in the fourth computer program is configured to:
first solve for all zero constraints and traffic constraints;
determine a number of free spaces on a page of search results to be provided in response to a search query not taken up by advertisers at a traffic limit and a number of advertisers not currently at a zero limit or a traffic limit; and solving a system of equations to determine the respective advertiser's budget constraint.

* * * * *

UNITED STATES PATENT AND TRADEMARK OFFICE
CERTIFICATE OF CORRECTION

PATENT NO. : 7,454,409 B2 Page 1 of 1
APPLICATION NO. : 10/403823
DATED : November 18, 2008
INVENTOR(S) : Scott Roy et al.

It is certified that error appears in the above-identified patent and that said Letters Patent is hereby corrected as shown below:

In column 20, claim 1, line 17, after "for a specified price;" delete "and".

In column 20, claim 1, line 21, immediately after "engagements" replace "." with --;--.

Signed and Sealed this

Twenty-ninth Day of September, 2009

David J. Kappos
*Director of the United States Patent and Trademark Office*